United States Patent [19]

Takanashi et al.

[11] Patent Number: 5,144,415
[45] Date of Patent: Sep. 1, 1992

[54] APPARATUS FOR PROCESSING INFORMATION CARRIED BY ELECTRO-MAGNETIC RADIATION BEAM

[75] Inventors: Itsuo Takanashi, Kamakura; Shintaro Nakagaki, Fujisawa; Hirohiko Shinonaga; Tsutou Asakura, both of Yokohama; Masato Furuya; Tetsuji Suzuki, both of Yokosuka, all of Japan

[73] Assignee: Victor Company of Japan, Ltd., Yokohama, Japan

[21] Appl. No.: 510,739

[22] Filed: Apr. 18, 1990

[30] Foreign Application Priority Data

Apr. 18, 1989 [JP] Japan .................................. 1-98515
May 22, 1989 [JP] Japan ................................. 1-128069

[51] Int. Cl.⁵ .................... H04N 3/10; H04N 1/028; G02F 1/135
[52] U.S. Cl. ............................... 358/43; 358/44; 358/55; 358/213.13; 358/225; 358/75; 358/471; 358/909; 359/68; 359/72; 359/250; 359/252; 359/254; 359/255; 359/273; 359/296; 365/108; 365/112
[58] Field of Search ............... 358/41, 44, 43, 55, 358/209, 213.13, 225, 471, 474, 482, 909, 75; 365/108, 112; 359/68, 72, 250, 252, 254, 255, 273, 296, 891

[56] References Cited

U.S. PATENT DOCUMENTS

| | | | |
|---|---|---|---|
| 3,723,651 | 3/1973 | Gorog | 359/72 |
| 3,932,025 | 1/1976 | Lakatos | 365/112 |
| 3,950,167 | 4/1976 | Tutihasi | |
| 3,957,349 | 5/1976 | Nelson | 359/72 |
| 4,095,280 | 6/1978 | Okumura | 365/112 |
| 4,170,475 | 10/1979 | Kuehnle | 365/112 |
| 4,403,848 | 9/1983 | Snelling | |
| 4,459,512 | 7/1984 | Ohata | |
| 4,680,642 | 7/1987 | Shimano | 358/75 |
| 4,712,878 | 12/1987 | Taniguchi | 359/68 |
| 4,778,985 | 10/1988 | Modisette | 365/112 |
| 4,831,452 | 5/1989 | Takanashi | 358/213.13 |
| 4,918,536 | 4/1990 | Sakakibara | |

Primary Examiner—Benjamin R. Fuller
Assistant Examiner—Scott A. Rogers
Attorney, Agent, or Firm—Michael N. Meller

[57] ABSTRACT

An apparatus for processing information carried by an electro-magnetic radiation beam. The apparatus includes a charge holding member for storing a charge latent image, a generator for generating an electro-magnetic radiation beam which is a superimposition of a plurality of electro-magnetic radiation beams with different wavelength ranges, a filter for separating the superimposed beam into the plurality of electro-magnetic radiation beams and a photo-conductive member provided adjacent to the charge latent image holding member and having an impedance which varies according to the intensity of each of the plurality of beams separated by the filter. Charge latent images corresponding to each of the plurality of beams are thus recorded on the charge latent image holding member. The charge latent images thus recorded on the charge latent image holding member are reproduced by means of a photo-modulation member provided instead of a photo-conductive member.

8 Claims, 19 Drawing Sheets

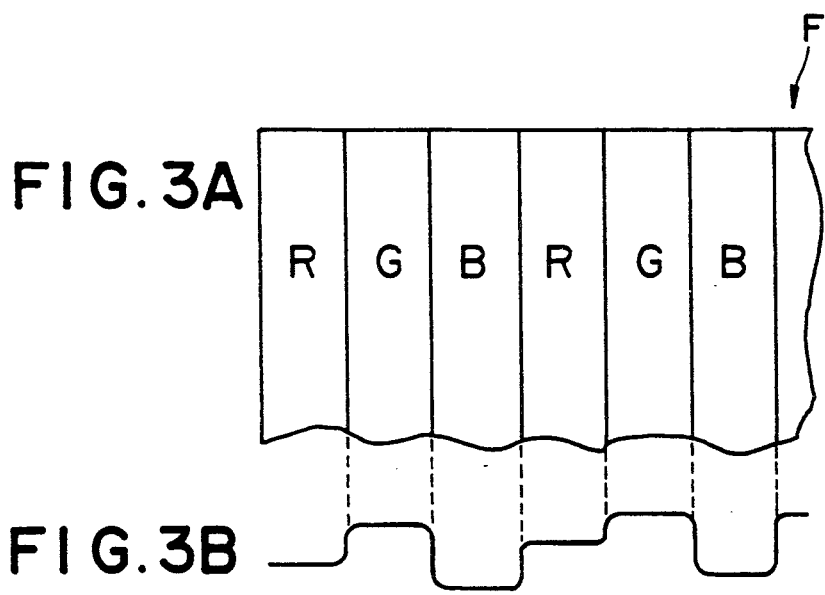
FIG. 3A
FIG. 3B
(PRIOR ART)
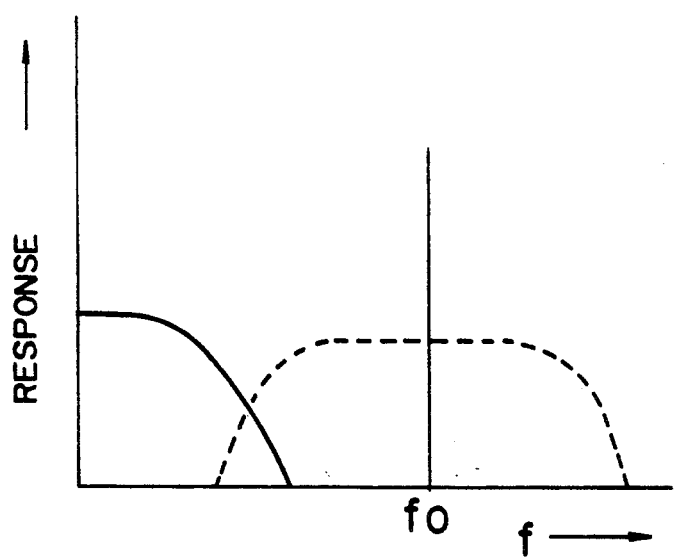
FIG. 4 (PRIOR ART)

APPARATUS FOR PROCESSING INFORMATION CARRIED BY ELECTRO-MAGNETIC RADIATION BEAM

BACKGROUND OF THE INVENTION

This invention relates to an apparatus for processing information carried by an electro-magnetic radiation beam to record the information on a specific recording apparatus as a charge latent image and reproduce the information by means of an electro-magnetic radiation beam such as light.

There is a conventional apparatus for recording/reproducing information such as a graphic image in the form of a charge latent image as shown in FIGS. 1 and 2. FIGS. 1 and 2 depict a recording system and a reproducing system, respectively.

Throughout the drawings, like reference numerals and letters are used to designate like or equivalent elements for the sake of simplicity of explanation.

First, the recording system will be explained with reference to FIG. 1. In FIG. 1, a recording medium 10 on which a charge latent image is intended to be recorded is composed of a charge holding layer (hereinafter abbreviated CHL) member 12 and a transparent electrode 14. A photoelectric recording head 16 is composed of a photoconductive layer (hereinafter abbreviated PCL) member 18 and a transparent electrode 20.

The recording medium 10 and the photoelectric recording head 16 are arranged such that the CHL member 12 and the PCL member 18 face each other across a predetermined space. The light carrying the optical image of an object O is allowed to be incident to the transparent electrode 20 of the photoelectric recording head 16 through an imaging lens 22, as depicted by an arrow A10.

A d.c. power supply 26 is connected across the electrodes 14 and 20 through a switch 24. There will be a discharge generated across the CHL member 12 and the PCL member 18 by turning on the switch 24.

In the configuration, the CHL member 12 is to hold charges for a long period of time and is formed of a material having extremely high insulation resistance, such as silicon resin. While, the PCL member 18 is to generate electron-hole pairs and is formed of, for example amolphous silicon. In FIG. 1, the electrons are transferred to the transparent electrode 20 side in the PCL member 18, whereas, the holes are transferred to the side in the layer 18, facing the CHL member 12. The electrodes 14 and 20 are formed of a material such as ITO (Indium Tin Oxide).

The recording operation of the recording system constituted as described above will now be explained. As is depicted by the arrow A10, the light carrying the optical image of the object O is incident to the imaging lens 22 and is further incident to the PCL member 18 of the photoelectric recording head 16, through the imaging lens 22 and the transparent electrode 20. The light is then absorbed in the PCL member 18 to generate the electron-hole pairs therein.

Now the switch 24 is turned on to allow the power supply 26 to apply a voltage across the electrodes 14 and 20. This causes the electrons in the PCL member 18 being attracted by the positive polarity of the power supply 26 to be transferred to the transparent electrode 20 side, while the holes are transferred to the side of the layer 18, facing the CHL member 12, as described above. The holes or the positive charge image corresponding to the optical image of the object O are therefore formed on the surface of the PCL member 18, facing the CHL member 12.

Furthermore, there is a discharge generated across the PCL member 18 and the CHL member 12 due to the voltage applied by the power supply 26. This discharge causes electrification on the surface of the CHL member 12 facing the PCL member 18, so that charges Q are stored thereon.

The electrification due to the discharge depends on the distribution of the holes or the positive charge image on the surface of the PCL member 18. The charge latent image corresponding to the optical image of the object O is thus transferred to the surface of the CHL member 12. Since the switch 24 causes the formation of the charge latent image, the switch 24 may be applied to a shutter of a camera.

Next, the reproducing system will be explained with reference to FIG. 2. In FIG. 2, there is arranged an optical reproducing head 28 facing the recording medium 10 on which the charge latent image has been recorded. The optical reproducing head 28 is composed of a photo-modulation layer (hereinafter abbreviated PML) member 30 and a transparent electrode 32. The surface of the PML member 30 faces the CHL member 12 of the recording medium 10, in the configuration. An optical reading unit 34 is further arranged to emit a reading light to the transparent electrode 32 of the optical reproducing head 28 as depicted by an arrow A12. The reading light passing through the optical reproducing head 28 and the recording medium 10 is allowed to be incident to a photo-detection unit 36 as depicted by an arrow A14.

In the configuration, PML member 30 of the optical reproducing head 28 is formed of a material such as $LiNbO_3$, BSO ($Bi_{12}SiO_{20}$), liquid crystal, PLZT (Lead lanthanum zirconate titanate) or EC (Electrochromic), having the photoelectric effect that light is varied according to the electric field. The photoelectric effect may be a double reflection effect, scattering effect or coloring effect. Selection of the material thus depends on the purpose. The optical reading unit 34 is composed of a laser light source, a polarizer, etc. (not shown), to generate the light for reading the charge latent image. The photo-detection unit 36 is further composed of a wave-plate, an analyzer, a photoelectric convertor, etc. (not shown), to detect the light incident thereto.

The operation of the reproducing system will now be explained. The charge latent image corresponding to the object O has already been recorded on the recording medium 10 as described with reference to FIG. 1. The optical reproducing head 28 is arranged adjacent to the recording medium 10 and the transparent electrodes 14 and 32 are electrically connected to each other. In this configuration, the electric field due to the latent charges Q will affect the PML member 30 to cause an electro-optic effect in the incident light.

Now the optical reading unit 34 emits the reading light to the optical reproducing head 28 to force the PML member 30 to cause the electro-optic effect. The phase of the light emitted to the PML member 30 and that of the light subjected to the electro-optic effect therein are therefore varied with respect to each other.

The reading light subjected to the electro-optic effect passes through the recording medium 10 and is incident to the photo-detection unit 36. The intensity distribution of the reading light is varied accordingly with the distribution of the latent charges Q by the analyzer (not shown) and is converted to electric siganls. As a result, the electric signals corresponding to the optical image of the object O are generated.

However, in the case of color image photographing by means of the conventional apparatus as described above, the light from the object O should be separated into primary colors by proper optical equipment, to be recorded, reproduced and combined with each other.

The conventional charge latent image recording/reproducing apparatus as described above has drawback that color superposition and color separation cannot be easily performed for its complex configuration.

Next, as for a conventional apparatus having a filter composed by arranging, with a specific order, a plurality of filter elements with different characteristic from each other, through which electro-magnetic radiation beams with specific and different ranges of wave length pass respectively, a color separation stripe filter F, as shown in FIG. 3A, composed by arranging a plurality of color stripe filter elements with different characteristics from each other is provided along an optical passage to an imaging device for generating a color superimposed signal.

The color separation stripe filter F shown in FIG. 3A is composed by arranging a color stripe filter R allowing red light R, G green light and B blue light to pass through a specific repeating order. Therefore, when an electron beam scans a photoelectric conversion section of an imaging device onto which an optical image passing through the filter F is projected, the imaging device generates a signal which is separated by the filter F, such as the signal shown in FIG. 3B that red, green and blue signals are each arranged on the time domain with a specific repeating order. The signal thus separated is the color-separated signal, as shown in FIG. 4, which is composed of a low-frequency component of the red, green and blue signals (the signal component existing in the region depicted by a solid line in FIG. 4) and a modulated signal component which is a carrier with a frequency f, corresponding to the repeating order of the color stripe filters of the color separation filter F, is amplitude modulated with the red, green and blue signals (the signal component existing in the region depicted by a dashed line.).

The conventional apparatus has the drawback that the color-superimposed signal generated by the conventional apparatus as described above is subjected to the quality of an optical system of the apparatus and the resolution of the imaging device thereof. Other than that, a demodulation means is required for obtaining three primary color signals from the superimposed signal, the signal-to-noise ratio (S/N) is degraded since the demodulated signal exists in the high-frequency range and the like.

Furthermore, since information is processed in the form of an electric signal conventionally, a signal processing circuit is required for each of the primary three colors which are to be processed by gamma correction or other signal processings. For that reason, the conventional apparatus is made complex for signal processing.

SUMMARY OF THE INVENTION

An object of the present invention is to provide apparatus for processing information carried by an electro-magnetic radiation beam capable of performing color processing such as color superimposition, color separation and the like.

There is provided an apparatus comprising a charge latent image holding member for storing a charge latent image, a beam generator for generating an electro-magnetic radiation beam which is a superimposition of a plurality of electro-magnetic radiation beams with different wavelength ranges, a filter for separating the superimposed beam from the beam generator into the plurality of beams and a photoconductive member provided adjacent to the charge latent image holding member and the impedance thereof varying according to the intensity of each of the plurality of beams separated by the filter wherein charge latent images corresponding to each of the plurality of beams are recorded on the charge latent image holding member.

The charge latent images thus recorded on the charge holding member are reproduced by means of a photo-modulation member provided instead of the photoconductive member.

There is also provided an apparatus comprising a charge latent image holding member for storing a charge latent image, a first beam generator for generating an electro-magnetic radiation beam which is a superimposition of a first plurality of electro-magnetic radiation beams with different wavelength ranges, a first filter for separating the superimposed beam generated by the first beam generator into the first plurality of beams, a photoconductive member provided adjacent to the charge latent image holding member and the impedance thereof varying according to the intensity of each of the plurality of beams separated by the first filter, a second beam generator for generating an electro-magnetic radiation beam which is a superimposition of a plurality of electro-magnetic radiation beams with different wavelength ranges, a second filter for separating the superimposed beam generated by the second beam generator into the second plurality of beams and a photo-modulation member provided adjacent to the charge latent image holding member and electro-opti effect occurring therein for each of the second plurality of beams separated by the second filter corresponding to the charge latent images prerecorded on the charge holding member, wherein charge latent images corresponding to each of the plurality of beams are recorded on the charge latent image holding member and the prerecorded charge latent images are reproduced by way of the electro-optic effect.

BRIEF DESCRIPTION OF THE DRAWINGS

FIG. 3 shows a conventional color separation stripe filter;

FIG. 3B is the waveform for explaining the signal separated by the filter shown in FIG. 3A;

FIG. 4 is the characteristic for explaining the signal separated by the filter shown in FIG. 3A;

DETAILED DESCRIPTION OF THE PREFERRED EMBODIMENTS

The preferred embodiments according to the present invention will be explained in detail with reference to the accompanying drawings.

First, the recording system of the first preferred embodiment according to the present invention will be explained with refernece to FIG. 5.

Figure 1:
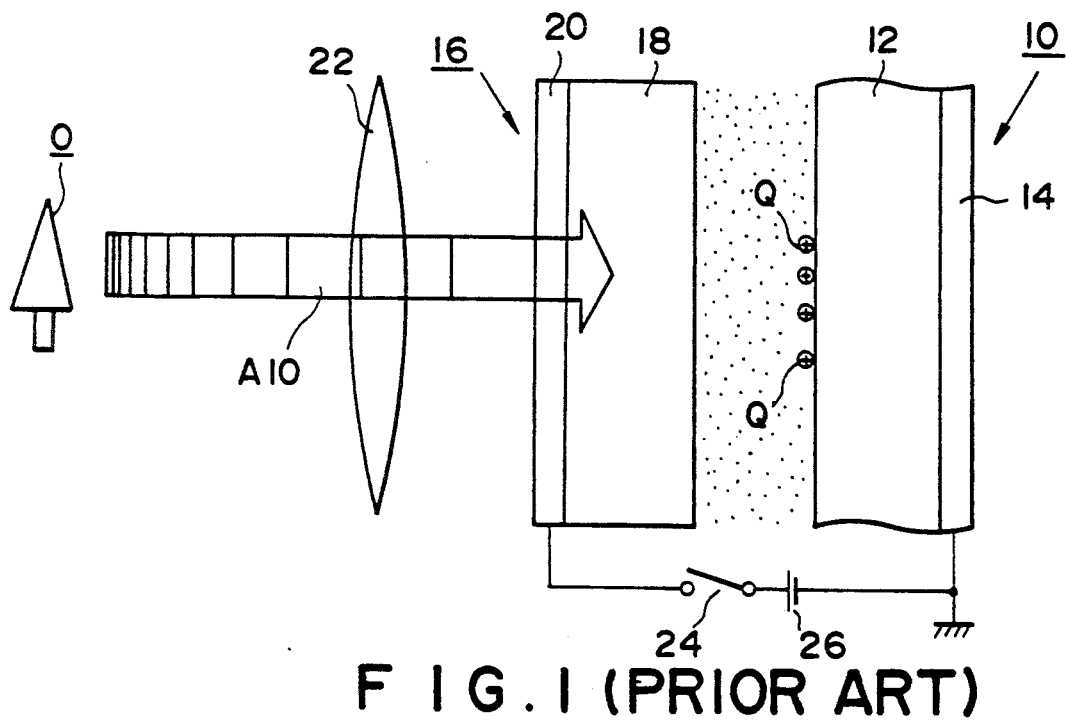
FIG. 1 is an explanatory view of the recording system of a conventional charge latent image recording/reproducing apparatus.
Figure 2:
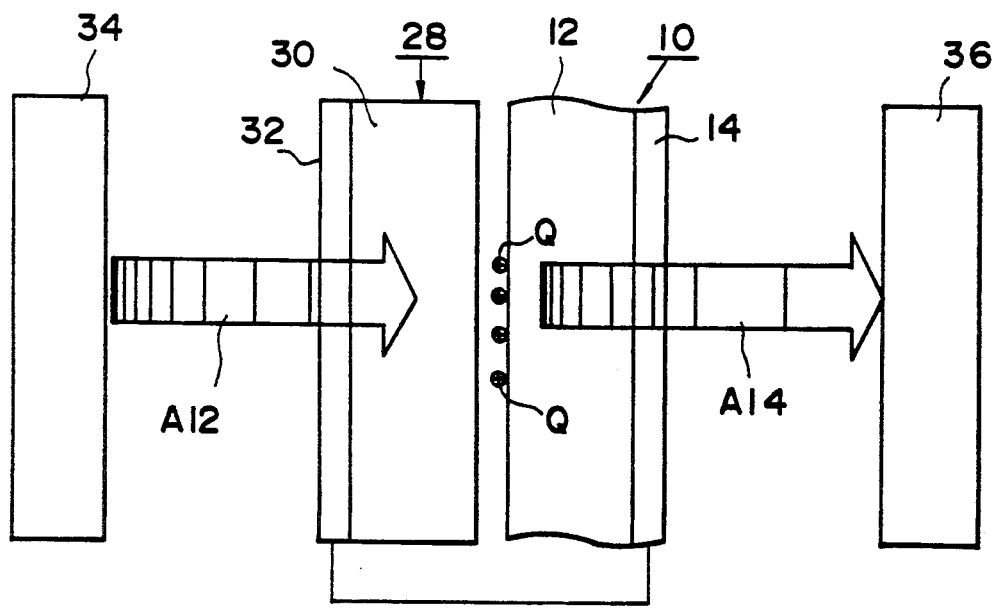
FIG. 2 is an explanatory view of the reproducing system of a conventional charge latent image recording-/reproducing apparatus.
Figure 5:
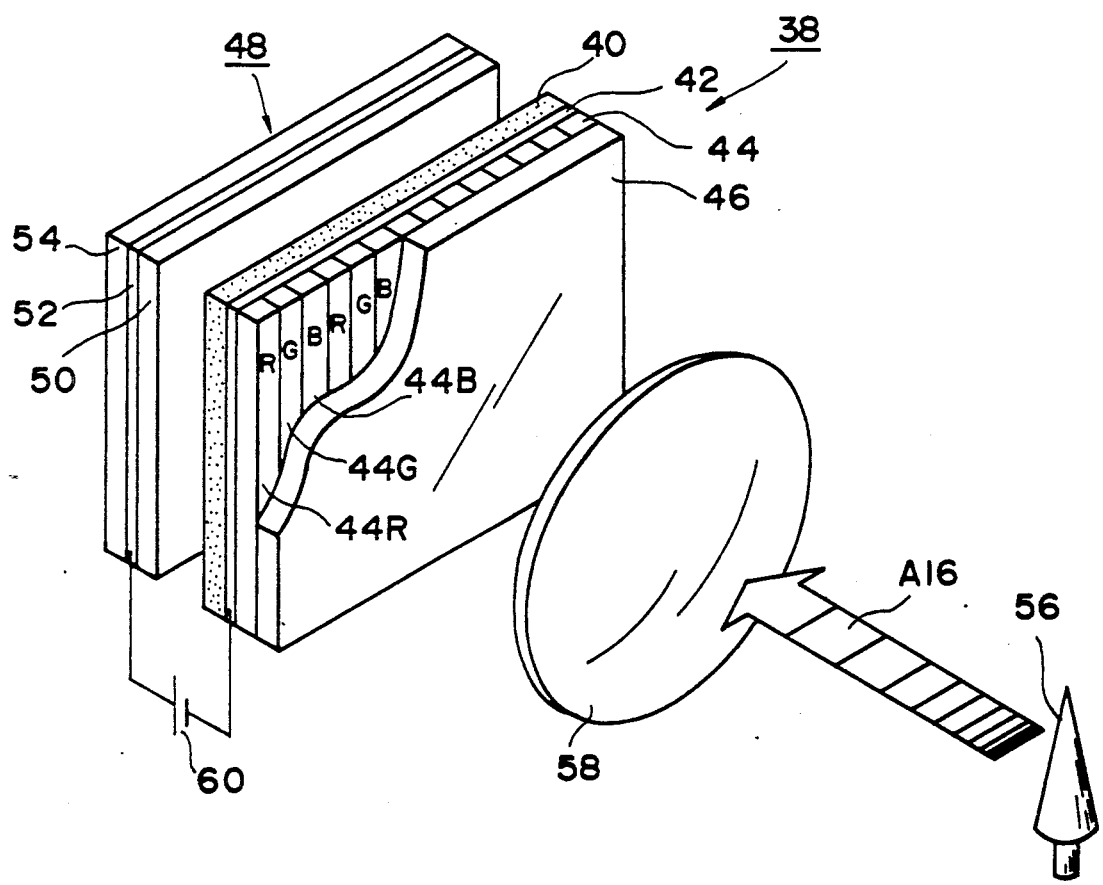
FIG. 5 is a perspective view of the first preferred embodiment of the recording system according to the present invention.

In FIG. 5, a recording medium 38 on which a charge latent image is intended to be recorded is composed of a CHL member 40, a transparent electrode 42, a color separation filter layer 44 and a glass base 46, laminated to each other in this order. The color separation filter layer 44 is composed such that minute bar filters; 44R, 44G and 44B which allow three primary colors red (R), green (G) and blue (B) pass therethrough respectively are arranged in this order. A recording head 48 is composed of a PCL member 50, an electrode layer 52 and base member 54 laminated to each other in this order.

The recording medium 38 and the recording head 48 are arranged such that the CHL member 40 and the PCL member 50 face each other with a specific gap. The light carrying the optical image of an object 56 is allowed to be incident to the recording medium 38 at the glass base 46 side thereof through an imaging lens 58, as depicted by an arrow A16. Furthermore, a power supply 60 is connected across the transparent electrode 42 and the electrode layer 52 to apply a voltage thereacross to generate discharge across the CHL member 40 and the PCL member 50.

In this configuration, the light carrying the optical image of the object 56 is incident to the imaging lens 58, as depicted by the arrow A16, to pass, through the imaging lens 58 and the recording medium 38 and is incident to the PCL member 50 of the recording head 48.

When the light carrying the optical image passes through the recording medium 38, the light of the image is separated into the three primary colors R, G and B by masking operation of the filters 44R, 44G and 44B. That is, among the incident light, a R component, only is allowed to pass through the filter 44R, a G component through the filter 44G and a B component through the filter 44B. Each separated incident light passes through the transparent electrode 42 and the CHL member 40, then is incident to the PCL member 50.

In the PCL member 50, the impedance of the portion at which each separated light is incident varies according to the intensity of the incident, light which is absorbed therein to generate electron-hole pairs, electron and a hole. As already mentioned, the voltage is applied across the transparent electrode 42 and the electrode layer 52 by the power supply 60. The electrons in the PCL member 50 are thus attracted to the positive polarity of the power supply 60 to be transferred to the electrode layer 52 side, while the holes are transferred to the PCL member 50 at the side thereof facing the CHL member 40. Consequently, the image of the holes or the positive charge image corresponding to the optical image of the object 56 is formed on the surface of the PCL member 50. This operation is conducted corresponding to each of the separated light componets R, G and B. As a result, the positive charge image is formed for each separated light.

Furthermore, the discharge occurs across the CHL member 40 and the PCL member 50 by applying the voltage of the power supply 60 to generate electrification on the surface of the CHL member 40. The charges Q are thus charged thereon. The electrification on the CHL member 40 is generated according to hole distribution on the surface of the PCL member 50, that is, the positive charge image thereon. Accordingly, a charge image corresponding to the optical image of the object 56 is transferred to the surface of the CHL member 40. As a result, the optical image of the object 56 is recorded on the surface of the recording medium 38 as a charge latent image by means of the recording head 48. Since the positive charge image on the surface of the PCL member 50 is formed for each separated light component, the charge latent image thus recorded on the recording medium 38 is also formed for each separated light component R, G and B.

Next, the reproducing system of the first preferred embodiment according to the present invention will be explained with reference to FIG. 6.

Figure 6:
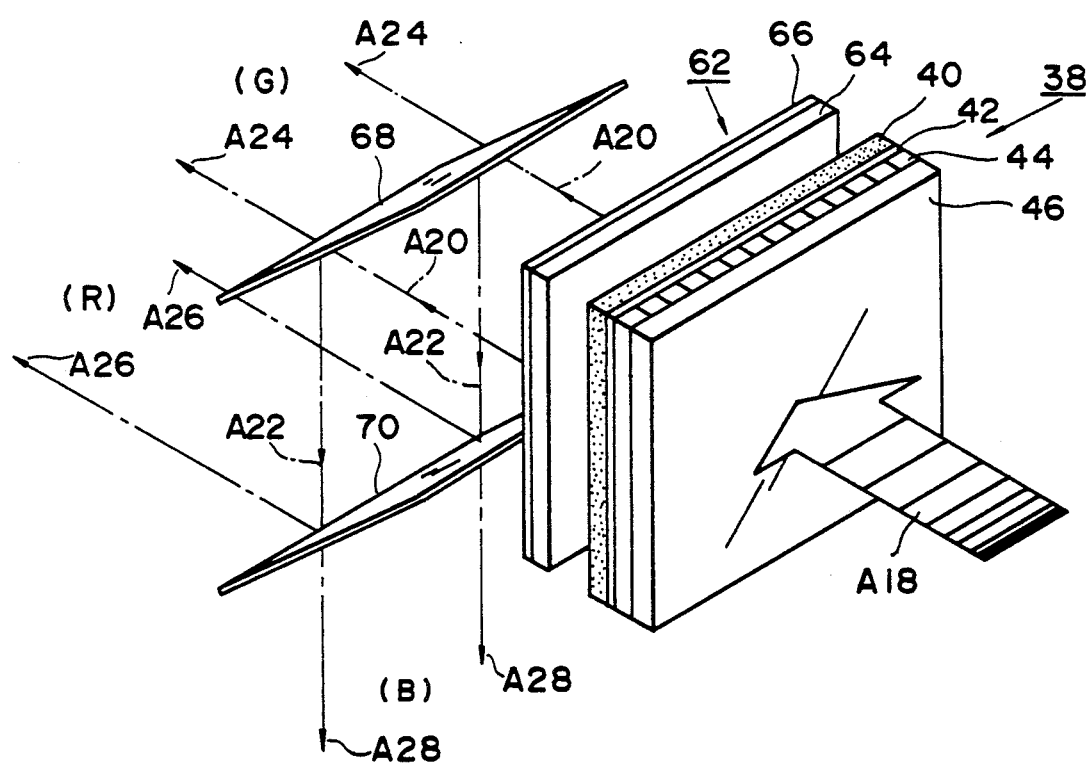
FIG. 6 is a perspective view of the first preferred embodiment of the reproducing system according to the present invention.

A reproducing head 62 is arranged to face the recording medium 38 on which the charge latent image has already been recorded in FIG. 6. The reproducing head 62 is composed of a PML member 64 and a transparent electrode 66. The PML member 64 at the surface thereof is arranged to face the CHL member 40 of the recording medium 38. A reading light is then allowed to be incident to the reproducing head 62 through the recording medium 38 as depicted by an arrow A18. As for the reading light, a white light or light which is a superimposition of the separated components R, G and B is adopted.

The reading light passing through the reproducing head 62 is allowed to be incident to dichroic filters 68 and 70, respectively. The dichroic filter 68 is composed to allow the G component of the incident light to pass therethrough, while the dichroic filter 70 allows the B component to pass therethrough.

The reading operation of the reading system will now be explained. As is already mentioned with reference to FIG. 5, the charge latent image of the object 56 has already been recorded on the recording medium 38. The reproducing head 62 is arranged adjacent to the recording medium 38, transparent electrodes 42 and 66 being electrically connected to each other. The electric field caused by the latent charges Q on the surface of the CHL, member 40 thus causes the PML member 64 to produce an electro-optic effect from the incident light.

When a reading light is incident to the recording medium 38 as depicted by an arrow A18, the reading light is separated into three primary colors red (R), green (G) and blue (B) by the color separation filter 44. Accordingly, separated light components R, G and B pass through the filters 44R, 44G and 44B, respectively to be incident to the reproduction head 62 to generate the electro-optic effect in the PML member 64. For exmaple, the phase difference of ordinary light and extraordinary light passing through the PML layer 64 varies according to the intensity of the electric field applied by the latent charges Q.

The reading light subjected to the electro-optic effect passes through the reproducing head 62 to be incident to the dichroic filter 68. The separated light component G only passes through the dichroic filter 68 as depicted by arrows A24. The other separated light components R and B are reflected at the dichroic filter 68 to be incident to the next dichroic filter 70 as depicted by arrows A22. The separated light component R is reflected at the dichroic filter 70 as depicted by arrows A26, whereas the separated light component B passes through the dichroic filter 70 as depicted by arrows A28. Consequently, the reading light subjected to the electro-optic effect is separated into the three components R, G and B by the dichroic filters 68 and 70.

In the operation described above, among the latent charges recorded on the recording medium 38, the latent charge formed by the light passing through the filter 44R of the color separation filter layer 44 subjects the separated light component R passing through the filter 44R and incident to the PML member 64 to the electro-optic effect generated therein, in the case of reproduction. The R component of the optical image of the object 56 is thus reproduced by separated light component R reflected at the dicroic filter 70 in the direction depicted by the arrow A26. The G and B components of the optical image of the object 56 are also reproduced in the same manner as described above.

As is understood from the foregoing, the charge images for the R, G and B colors are formed on the CHL member 40 44B of the color separation filter 44. Then, the PML member 64 subjects each of the separated light components R, G and B formed by the filters 44R, 44G and 44B to photo-modulation caused by the electric field of those charge images. Therefore, the color-separation images of the optical image of the object 56 are reproduced by the separated light components R, G and B.

Next, the second preferred embodiment according to the present invention will be explained with reference to FIGS. 7 and 8. The second embodiment comprises an improved recording medium as compared to the first embodiment.

Figure 7:
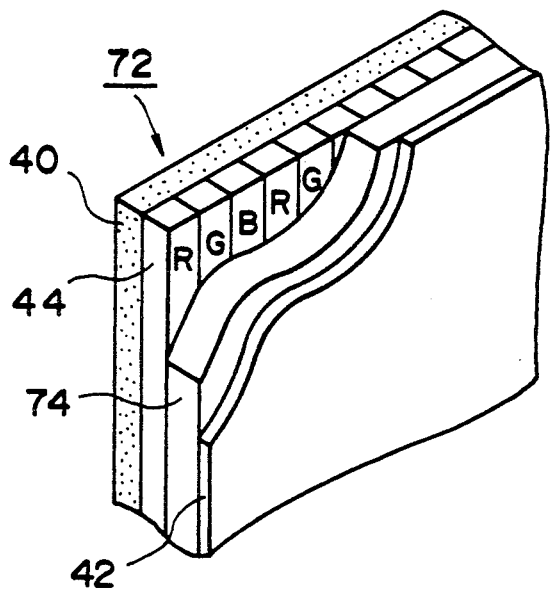
FIGS. 7 and 8 are perspective views of the second preferred embodiment of the recording medium FIGS. 4 and 5 according to the present invention.
Figure 8:
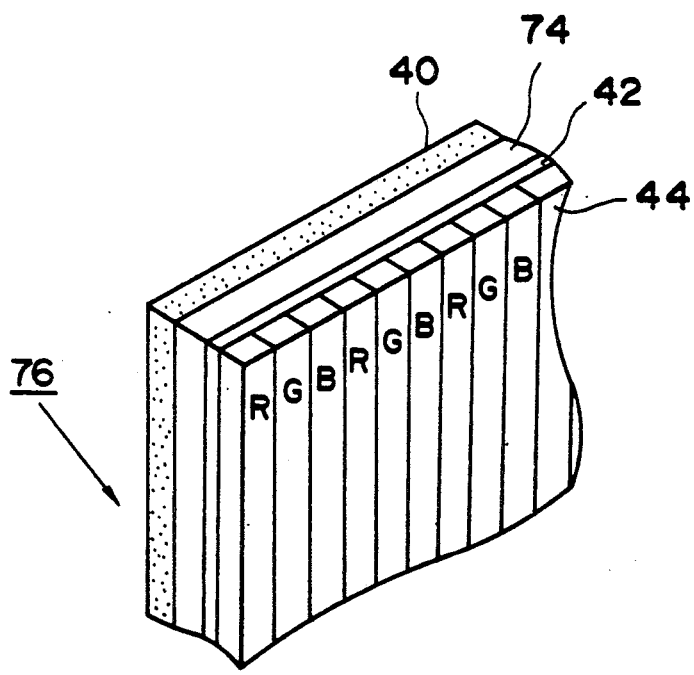

A recording medium 72 shown in FIG. 7 is composed by laminating the CHL member 40, the color separation filter layer 44, a PML member 74 and the transparent electrode 42. The color separation filter layer 44 and the PML member 74 are sandwiched between the, CHL member 40 and the transparent electrode 42. For recording medium 76 shown in FIG. 8, the PML member 74 is sandwiched between the CHL member 40 and the transparent electrode 42 while the color separation filter layer 44 is the outermost layer of the recording medium 76.

Figure 9:
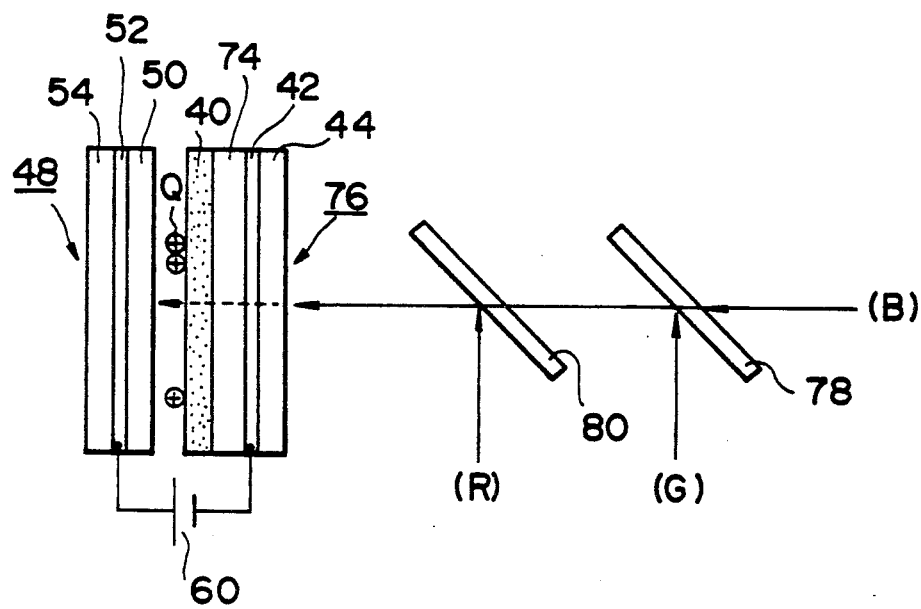
FIG. 9 is a side view of the recording system of the second preferred embodiment according to the present invention.
Figure 10:
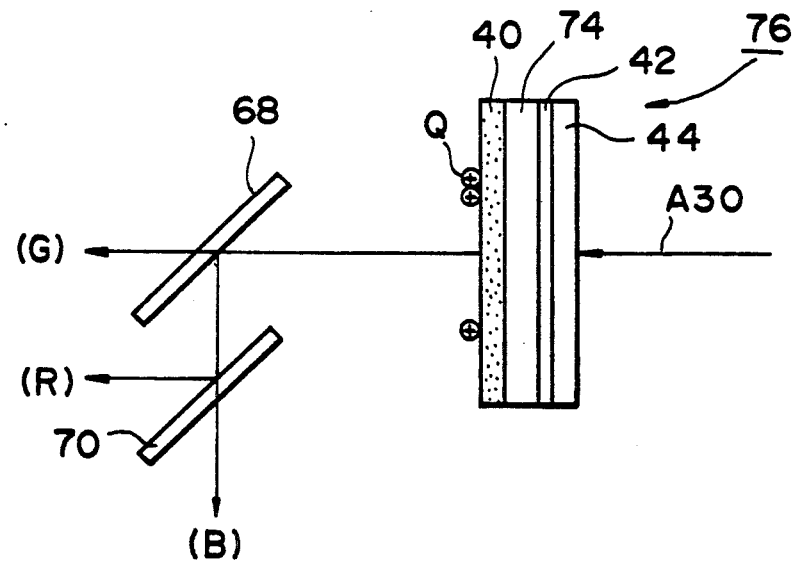
FIG. 10 is a side view of the reproducing system of the second preferred embodiment according to the present invention.

By employing recording media 72 and 74, an imaging apparatus can be constituted as shown in FIGS. 9 and 10.

The recording system will firstly be explained wit reference to FIG. 9. The recording head 48 is arranged to face the recording medium 76 at the CHL member 40 side thereof. A specific voltage is applied across the transparent electrode 42 and the electrode layer 52 by the power supply 60.

Among the color-separated light component R, G and B modulated respectively according to the information intended to be recorded, the color-separated light components B and G are respectively incident to a dichroic filter 78 to be superimposed together. The superimposed light and the separated light compont R are respectively incident to a dichroic filter 80. The separated light components R, G and B are then superimposed by the dichroic filter 80 to be incident to the recording medium 76.

The superimposed light thus incident to the recording medium 76 is separated by the color-separation filter layer 44 and charge latent images are formed on the CHL member 40 of the recording medium 76 by means of the electro-optic effect and the discharge in the PCL member 50 of the recording head 48 in the same manner as described in the first embodiment.

Each of the charge latent images thus formed on the CHL member 40 corresponds to the information carried by each of the separate light components R, G and B superimposed and incident to the recording medium 76.

The reproducing system for reproducing the charge latent image recorded on the recording medium 76 for the R, G and B components will be explained with reference to FIG. 10. The dichroic filters 68 and 70 are respectively provided to face the recording medium 76 at the CHL member 40 side thereof. There is no reproducing head, since the PML member 74 is provided in the recording medium 76.

In this configurration a white light or the light which is a superimposition of the single-wavelength light components R, G B is incident to the recording medium 76 as a reading light as depicted an arrow A30. The reading light is separated by the color-separation filter layer 44 in the same manner as described in the first embodiment. Among the portions of the CHL member 40, the portion where the charge latent image formed by only the separated light component R is irradiated with the separated reading light component R. The separated reading light G and B are also incident to the CHL member 40.

When reading light reaches the PML member 74, the electro-optic effect occurs therein due to the electric field caused by the latent charges on the CHL member 40. For example, when the separated reading light component R is incident to the PML member 74, the electro-optic effect due to the charge latent image of R occurs to the separated reading light component R. This is also the same for G and B. The reading light thus modulated is incident to the dicroic filters 68 and 70 to be separated into R, G and B components in the same manner as described in the first embodiment.

Figure 11:
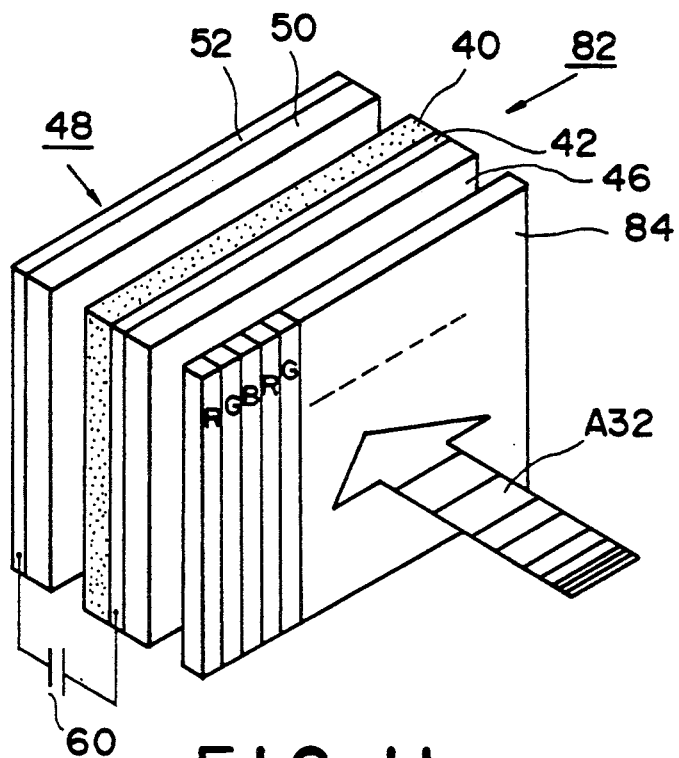
FIG. 11 is a perspective view of the recording system of the third preferred embodiment according to the present invention.

The third preferred embodiment according to the present invention will be explained with reference to FIGS. 11 and 12. In the third embodiment, the color-separation filter layer is provided apart. FIG. 11 shows the recording system, whereas FIG. 12 shows the reproducing system.

Figure 12:
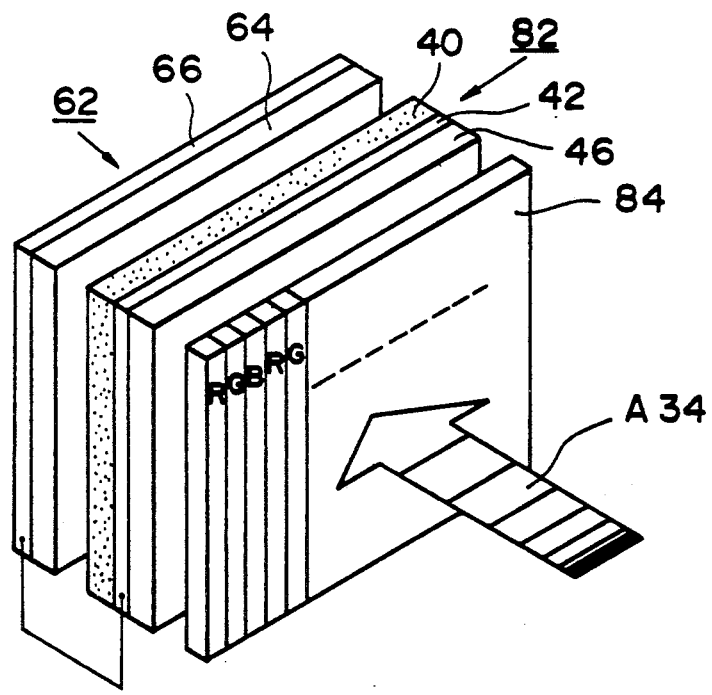
FIG. 12 is a perspective view of the reproducing system of third preferred embodiment to according to the present invention.

In FIGS. 11 and 12, a recording medium 82 is composed by laminating the CHL member 40, the transparent electrode 42 and the glass base 46. The recording head 48 or the reproducing head 62 is arranged to face the recording medium 82 at the CHL member 40 side. A color-separation filter layer 84 is arranged to face the recording medium 82 with a specific gap.

The light carrying the information intended to be recorded is incident to the color-separation filter layer 84 as depicted by an arrow A32, passes therethrough and is incident to the recording medium 82. The reading light for reproduction is incident to the color-separation filter layer 84 as depicted by an arrow A34, passes therethrough and is incident to the recording medium 82. The recording/reproduction of the, charge latent image is performed in the same manner as described in the first and second embodiments.

According to the third embodiment, the color-separation filter layer is provided apart, which is easily exchanged with another one. Furthermore, the arrangement of R, G and B in the filter layer may be different from each other in the recording/reproducing systems.

For example, in the case of recording, a color-separation filter layer where filter elements R, G and B are arranged in this order may be employed, whereas in the case of reproduction, a color-separation filter layer where filter elements B, R and G are arranged in this order may be employed. In this case, the charge latent image formed by the separated light component R is reproduced by the separated light component B, that formed by the separated light component G is reproduced by the separated light R and that formed by the separated light component B is reproduced by the separated light component G.

Moreover, filters with differnt color configuration from each other in the case of recording/reproduction may be employed such as primary color filters of R, G and B for recording, whereas an additive complementary color filter of C (Cyanogen), M (Magenta) and Y (yellow) may be employed for reproduction.

Figure 13:
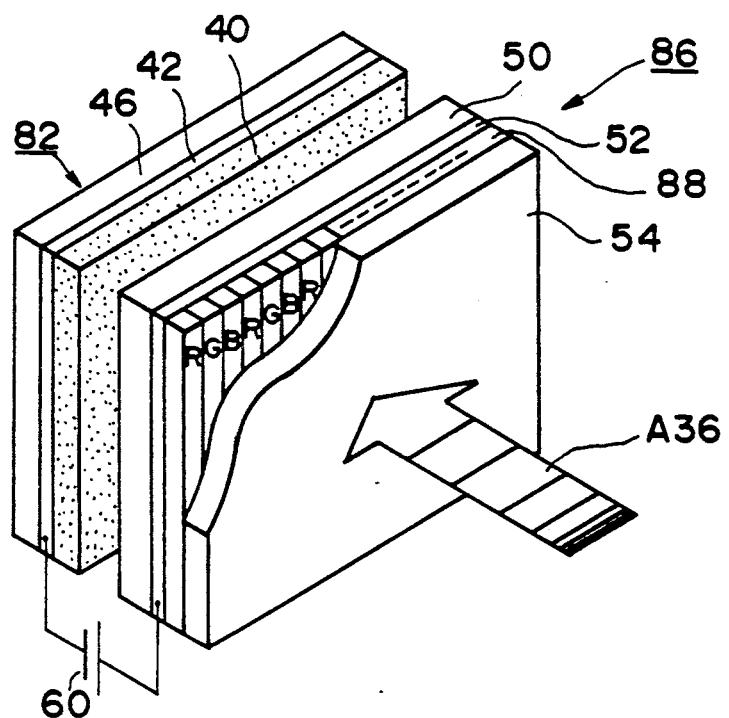
FIG. 13 is a perspective view of the recording system of the fourth preferred embodiment according to the present invention.

The fourth preferred embodiment according to the present invention will be explained with reference to FIGS. 13 and 14. In this embodiment, the color-separation filter layer is provided in the side of the recording head or reproducing head. FIG. 13 shows the recording system, whereas FIG. 14 shows the reproducing system.

In FIG. 13, a recording head 86 is composed by laminating the PCL member 50, the transparent electrode 52, the base material 54 and a color-separation filter layer 88 which is sandwiched between the transparent electrode 52 and the base material 54.

Figure 14:
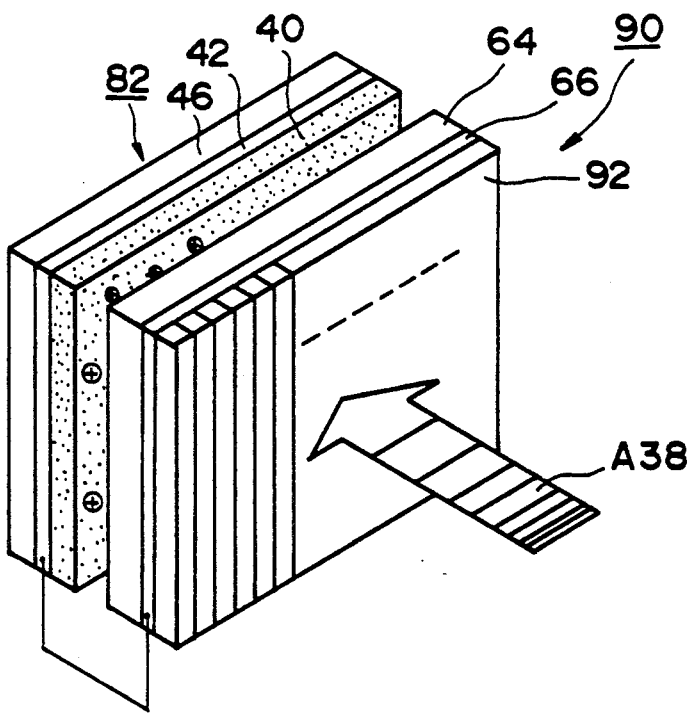
FIG. 14 is a perspective view of the reproducing system of the fourth preferred embodiment according to the present invention.

In FIG. 14, a reproducing head 90 is composed by laminating the PML member 64, the transparent electrode 66 and a color-separation filter layer 92 which is the outermost layer of the reproducing head 90.

The light carrying the information intended to be recorded is incident to the recording head 86 as depicted by an arrow A36 in FIG. 13 to form a charge latent image of each of components R, G and B on the recording medium 82 by means of a masking operation of the color-separation filter layer 52. The, reading light for reproduction is incident to the reproducing head 90 as depicted by an arrow A38 in FIG. 14 to read the charge latent image of each of the components R, G and B on the recording medium 82 by the separated light of each of the components R, G and B by means of a masking operation of the color-separation filter layer 92.

The dichroic filters 68, 70, 78 and 80 shown in FIGS. 9 and 10 may be used in the light incident section of the recording system and light separation section of the reproducing system in the third and fourth embodiments.

Next, a three-color separation system employing an electro-magnetic radiation beam processing apparatus as the fifth preferred embodiment according to the present invention will be explained with reference to FIG. 15.

Figure 15:
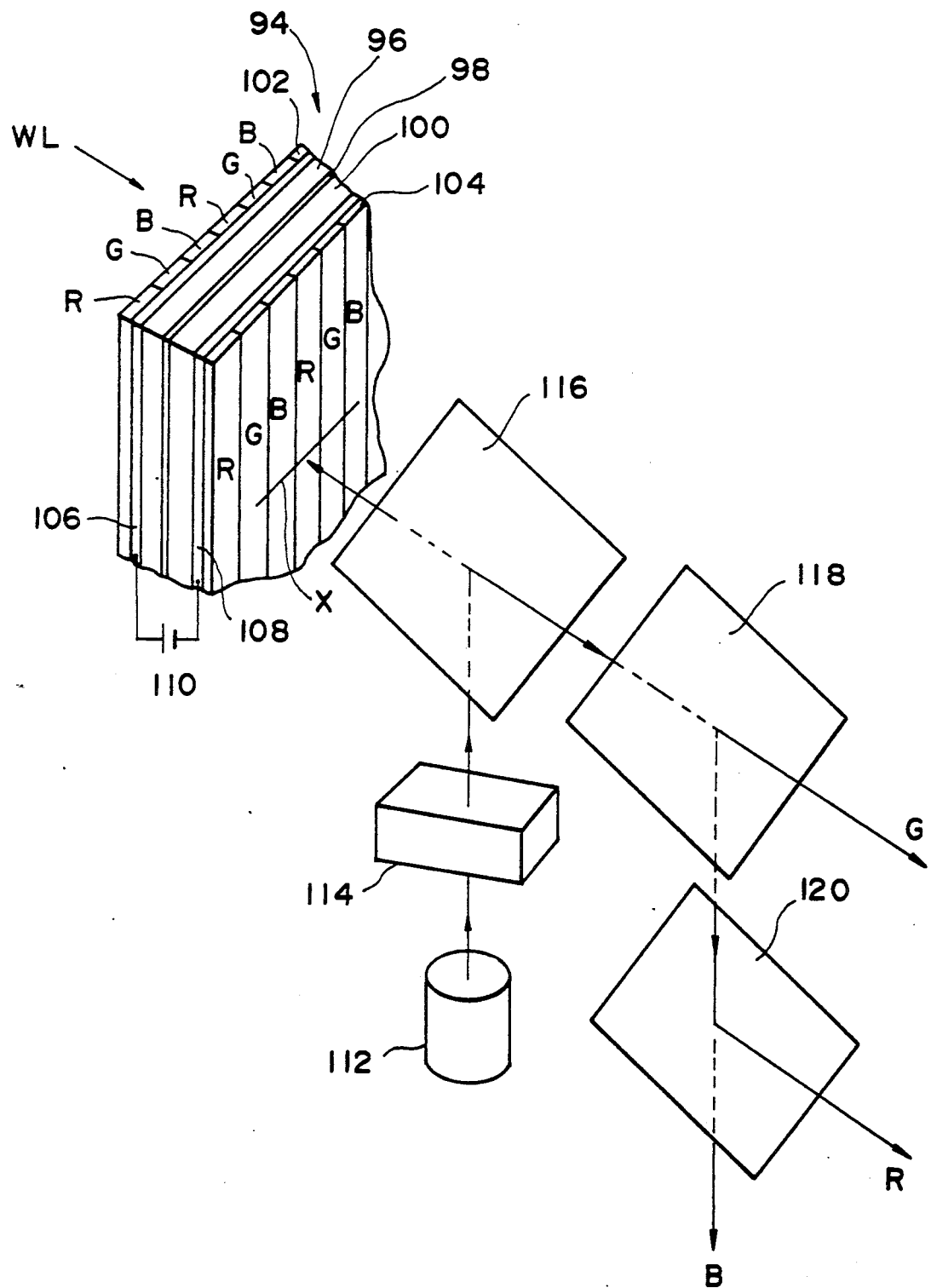
FIG. 15 is a block diagram of a three color separation system applied in fifth preferred embodiment of the recording/reproducing system according to the present invention.

In FIG. 15, there is depicted a first filter 102 where a plurality of filter elements with different characteristic from each other, through which electro-magnetic radiation beams with specific and different range wavelength ranges pass, respectively are arranged with specific repeating order.

There is also depicted in FIG. 15 a second filter 104 where a plurality of filter elements with different characteristic from each other, through which electro-magnetic radiation beams with specific and different range of wave length pass respectively, the number of which being the same as that for the filter 102, are arranged so as to align with each of the filter elements of the first filter 102.

Therefore, each of the first and second filters 102 and 104 are arranged such that a plurality of pairs of the filter elements of the filters 102 and 104 are aligned in the direction of an incident electro-magnetic radiation beam.

The first and second filters 102 and 104 are color-separation stripe filters wherein a plurality of stripe color filter elements R allowing red light to, G allowing green light and B allowing blue light to pass therethrough, are arranged in a specific repeating order.

In FIG. 15, the first and second filters 102 and 104 are so arranged that stripe color-filter elements with the same characteristic are facing each other and provided at both sides of a photo-to-photo transducer (hereinafter abbreviated PPT) 94.

That is, the stripe color filter elements R of the first and second filters 102 and 104 form a pair which is provided at both sides of the PPT 94. The same applies for B.

WL is an electro-magnetic radiation beam carrying an image information (hereinafter expressed as a writing light). This writing light WL carries optical image information of an object through an optical imaging system. Or the light WL is a bundle of beams intensity modulated by an optical image information and deflected by an optical deflection means, an electro-magnetic wave information including image information and the like.

The light WL is separated into three primary colors through each of the filter elements R, G and B to be projected onto a PCL member 96 of the PPT 94.

The configuration and the operation of the PPT 94 be explained with reference to FIG. 16. The PPT 94 is composed of electrodes 106 and 108, a PCL member 96 allowing the light WL to pass therethrough, a dielectric mirror 98 reflecting an electro-magnetic radiation beam (hereinafter expressed as a reading light RL) whose wavelength range is different from that of the light WL, and a PML 100 made of lithium niobate or nematic liquidmonocrystal which modulates an electro-magnetic radiation beam according to a field intensity distribution.

The electrode 106 is transparent to an electro-magnetic radiation beam with the wavelength range of the light WL, whereas electrode 108 is transparent to a beam with the wavelength range of the light RL.

An a.c. power supply 122 is connected across the electrodes 106 and 108 for writing/reading operation. The writing/reading operation by applying a d.c. voltage across the electrodes 106 and 108 has been described in detail in EP Application No. 89306243.0, which disclosure is incorporated herein by reference.

Figure 16:
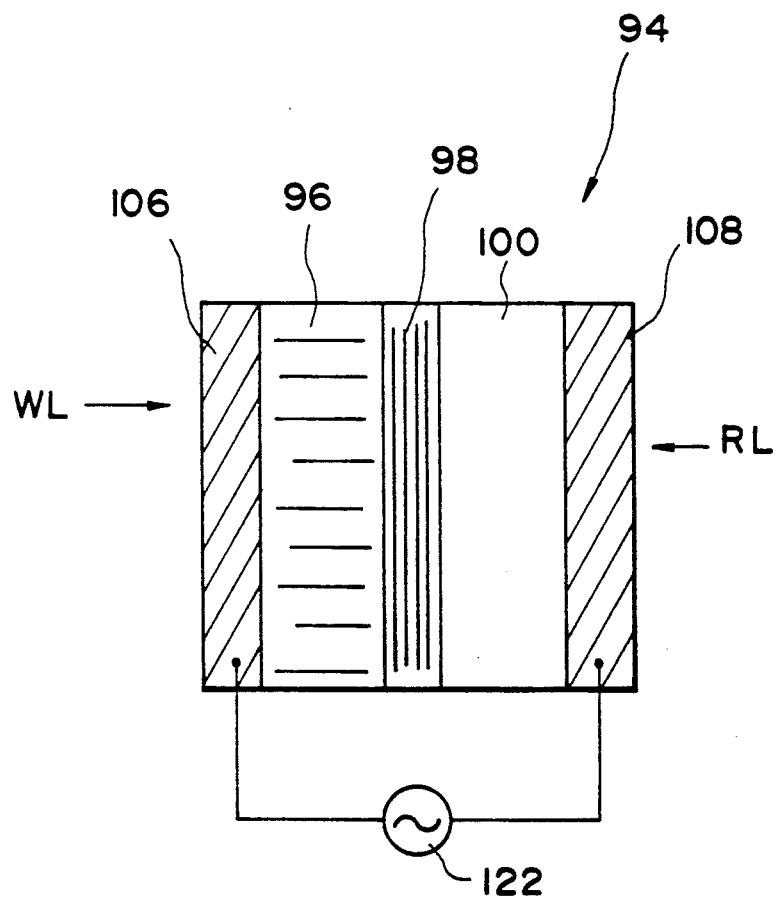
FIG. 16 is a side view of the photo-to-photo transducer applied in the system shown in FIG. 15.

When an a.c. voltage is applied across the electrodes 106 and 108 in FIG. 16, an alternating electric field is applied across the PCL member 96 and the PML member 100. Electrons and holes forming pairs are generated in the PCL member 96 according to the intensity of the light WL incident to the PCL member 96 and are reciprocally transferred therein. The impedance of the PCL member 96 thus varies according to the intensity of the light WL incident thereto.

Therefore, the field intensity applied across the PML member 100 corresponds to the intensity of the light WL incident to the PCL member 96. Consequently, when the light RL passes through the PML member 100, the light RL is modulated according to the field intensity applied across the PML member 100 and is emitted out from the PPT 94.

Erasing operation is not required in the case of writing/reading operation by applying an a.c. voltage across the electrodes 106 and 108.

In FIG. 16, the dielectric mirror 98 can be omitted by setting the sensitivity of the PCL member 96 and that of the PML member 100 to be different from each other.

Now return to FIG. 15, when the light WL carrying an image information is projected onto the PCL member 96 of the PPT 94 through the first filter 102, the charge latent images separated into primary colors by the stripe filter elements R, G and B of the first filter 102 are formed in the vicinity of the border of the PCL member 96 and the dielectric mirror 98, corresponding to the image information The region of the charge latent image thus formed by the electro-magnetic wave information passing through the stripe color filter element R of the first filter 102 corresponds to the stripe color filter element R of the second filter 43. This is also the same for the stripe color filter elements G and B.

When the light RL is incident to the PPT 94 through the second filter 104 to read the charge latent images formed in the vicinity of the border of the PCL member 96 and the dielectric mirror 98, the charge latent image formed by the electro-magnetic wave information passing through the stripe color filter element R of the first filter 102 is read out through the stripe color filter element R of the second filter 104. This is also the same for the stripe color filter elements G and B.

The followings may be applied to the light RL for reading the charge latent image from the PPT 94.

(1) The irradiatied area of the electro-magnetic radiation beam (which is the reading light comprising superimposed red, green and blue light) including all wavelength ranges transparent to each of the filter elements of the second filter 104 is made large enough to irradiate the entire surface of the PPT 94 at a time.

(2) The electro-magnetic radiation beam (which is the reading light comprising superimposed including all wavelength ranges transparent to each of the filter elements of the second filter 104 is made as the beam having a diameter shorter than the length determined by the repeating cycle of the two-dimensional arrangement of the filter elements of the second filter 104 to scan the entire surface of the PPT 94.

(3) The irradiated area of the electro-magnetic radiation beam (red, green or blue light) including wavelength ranges transparent to any one of the filter elements of the second filter 104 is made large enough to time-divisionally irradiate the entire surface of the PPT 94 at a time.

(4) The electro-magnetic radiation beam (the red, green or blue light) including wavelength ranges transparent to any one of the filter elements of the second filter 104 is made as the beam having a diameter shorter than the length determined by the repeating cycle of a two-dimensional arrangement of the filter elements of the second filter 104 to sequentially scan the entire surface of the PPT 94.

In FIG. 15, the reading light RL emitted from an electro-magnetic radiation beam source (a reading light source) 112 for reading is arranged as described in (2) to be supplied to a deflector (an optical deflector) 114.

The optical deflector 114 emits the bundle of beams of the light RL incident thereto in the direction depicted by an arrow X and that orthogonal to the arrow X to make the light RL be incident to a beam splitter 116. The light reflected at the beam splitter 116 is further incident to the PPT 94 at the electrode 108 side thereof through the second filter 104.

The bundle of beams thus incident to the PPT 94 is made as light having different wavelength ranges from for each of the stripe filter elements R, G and B of the second filter 104. Therefore, the light RL passing through the stripe color filter element R of the second filter 104 is used only for reading the charge latent image formed only by the electro-magnetic wave information passing through the stripe color filter element R of the first filter 104. This is also the same for G and B.

When each of the red, green and blue light components funcioning as the reading light reciprocates in the PML member 100 of the PPT 94, the light is modulated by the electric field of the charge latent image formed in the vicinity of the border of the PML member 100 and the dielectric mirror 98 and is emitted through the electrode 108 and the second filter 104, then the light is supplied to the beam splitter 116 and passes therethrough to be supplied to a dichrois mirror 118.

The dichrois mirror 118 allows the green light to pass therethrough and reflects the red and blue light. Therefore, the green light carrying the information of the charge latent image formed by the electro-magnetic wave information passing through the stripe color filter element G of the first filter 102 is emitted from the dichrois mirror 118.

The red and blue light reflected at the dicroic mirror 118 are incident to a dichrois mirror 120 where the blue light passes therethrough, whereas the red light is deflected. Therefore, the blue light carrying the information of the charge latent image formed by the electro-magnetic wave information passing through the stripe color filter element B of the first filter 102 and the red light carrying the information of the charge latent image formed by the electro-magnetic wave information passing through the stripe color filter element R of the first filter 102 are emitted from the dichroic mirror 120.

Each light thus emitted is made to pass through an analyzer (not shown) to be the light having optical intensity corresponding to the image information.

As is understood from the foregoing, the three color separation system applied with the electro-magnetic wave information processing apparatus with simple configuration according to the present invention overcomes the problems of conventional apparatus, whereby the signal-to-noise ratio is degraded since colors are superimposed in high-frequency range, a demodulation means is required and the like.

An example of a displaying apparatus applied with the electro-magnetic wave information processing apparatus as the sixth preferred embodiment according to the present invention will be explained with reference to FIG. 17.

Figure 17:
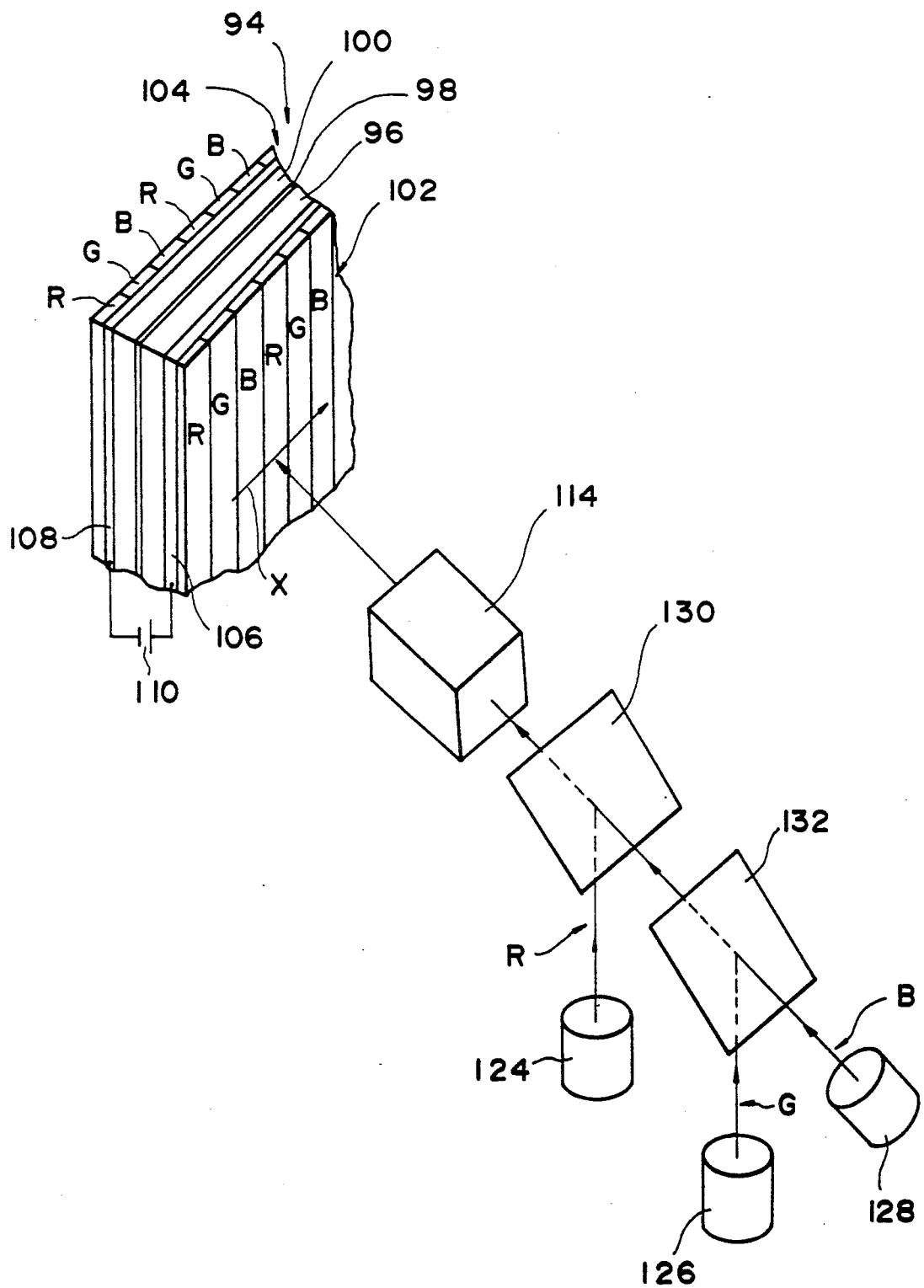
FIG. 17 is a block diagram of a color image displaying apparatus applied with the sixth preferred embodiment of the recording/reproducing system according to the present invention.

The following are the methods to record the image information intended to be displayed by the displaying apparatus on the PPT 94 thereof, in FIG. 17.

(a) The surface information of a color image is projected onto the PCL member 96 of the PPT 94 through the first filter 102.

(b) The primary three color-image informations forming a color image are incident to the PCL member 96 through a deflection system and the first filter 102.

The displaying apparatus shown in FIG. 17 adopts the method (b). In FIG. 17, an electro-magnetic radiation beam source 124 emits a beam carrying the primary color image information of red in the image information intended to be displayed. The beam is then reflected at a dichrois mirror 130 and is incident to the optical deflector 114. A beam carrying the primary color image information of green in the image information intended to be displayed emitted from an electro-magnetic radiation beam source 126 is reflected at a dichrois mirror 132, passes through the dicroic mirror 130, and is then incident to the optical deflector 114. Moreover, a beam carrying the primary color image information of blue in the image information intended to be displayed emitted from an electro-magnetic radiation beam source 128 passes the dichrois mirrors 132 and 130, and is then incident to the optical deflector 114.

The beam which is a superimposition of the primary color image information at the optical deflector 114 scans the first filter 102 in the direction depicted by the arrow X and the direction orthogonal to that direction to pass therethrough. The beam is then incident to the PPT 94 through the electrode 106, as a writing light. The writing light is a beam having a diameter shorter than the length determined by the repeating cycle of a two-dimensional arrangement of each filter element (each of the stripe filters R, G and B) of the first filter 102.

The writing light is separated into three primary colors by each of the stripe filters R, G and B and is projected onto the PCL member 96 of the PPT 94, and then forms a charge latent image in the vicinity of the border of the PCL member 96 and the dielectric mirror 98. The charge latent image thus corresponds to the image information which is a color-separation of the image information intended to be displayed.

Next when a reading light is incident to the second filter 104 in FIG. 17, as alredy described, the charge image formed in the vicinity of the border of the PCL member 96 and the dielectric mirror 98 is emitted through the second filter 104, as the electro-magnetic radiation image. The reading light may be applied with (1) to (4) described with reference to FIG. 15.

The reading light incident to the PPT 94 is the light having from each of wavelengths different from each for passing through each of the stripe filters of the second filter 104. The reading light passing through the stripe color filter R of the second filter 104, allowing red light to pass therethrough, is used only for reading the electro-magnetic wave information passing through the stripe color filter R of the first filter 102. This is also same for green and blue light.

Each color light emitted through the second filter 104 is modulated by the electric field of the charge image formed in the vicinity of the border of the PML member 100 and the dielectric mirror 98 when the color light reciprocates in the PML member 100. Each color light then passes through an analyzer (not shown) to display a color image.

Figure 18:
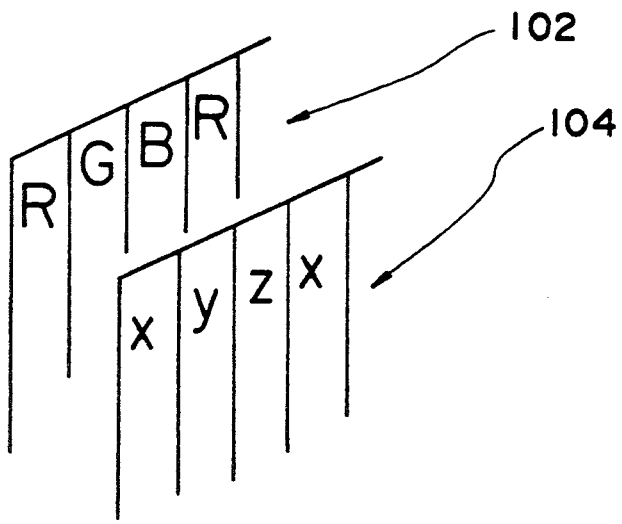
FIGS. 18 to 21 are perspective views and side views for explaining the correspondence of first and the second filters applied to the preferred embodiments according to the present invention.
Figure 19:
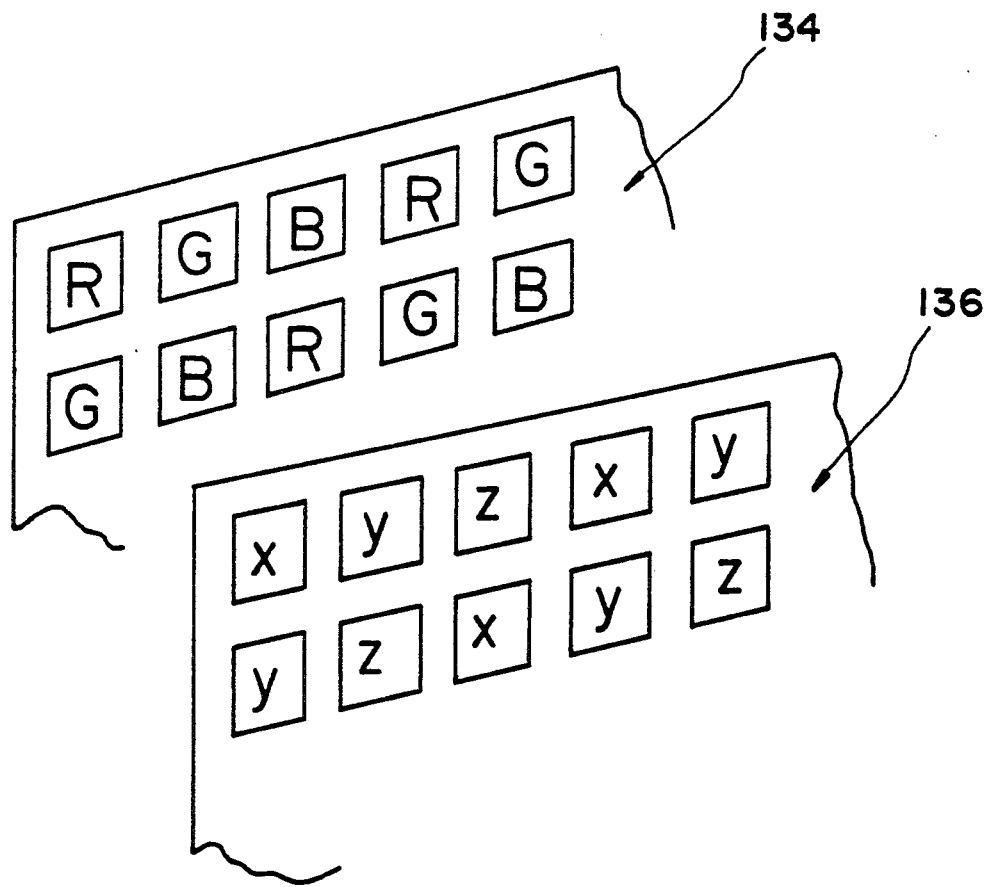

Configuration of the first and second filters 102 and 104 should not be limited to that shown in FIGS. 15 and 17, but may also be as shown in FIGS. 18 and 19 and the like.

The first filter 102 shown in FIG. 18 is the color-separation stripe filter wherein a plurality of filter elements having different characteristics, the stripe color filter R allowing red light, G allowing green light and B allowing blue light to pass therethrough are arranged in a specific repeating order.

The second filter 104 is the colors-separation stripe filter wherein three stripe filters x, y and z having different characteristics allowing each of any selected three colors to pass therethrough are arrenged in a specific repeating order.

FIG. 18 shows the example of the arrangement of the first and second filters 102 and 104 wherein the stripe filters R and x, G and y and B and z form respective pairs.

A first filter 134 shown in FIG. 19 is the color-separation dot filter wherein a plurality of filter elements having different characteristics the R allowing red light, G allowing green light and B allowing blue light to pass therethrough are arranged in a specific repeating order.

A second filter 136 is the color-separation dot filter wherein three filter regions x, y and z having different characteristics allowing each of any selected three colors to pass therethrough are arranged in a specific repeating order.

FIG. 19 shows the example of the arrangement of the first and second filters 134 and 136 wherein the filter regions R and x, G and y and B and z form respective pairs.

The arrangement of the first and second filters is not limited to those described with reference to FIGS. 18 and 19 whereby the filter elements are arranged in order, but also includes arrangements whereby pairs of the filter elements of the first and second filters are irregularly arranged.

Figure 20:
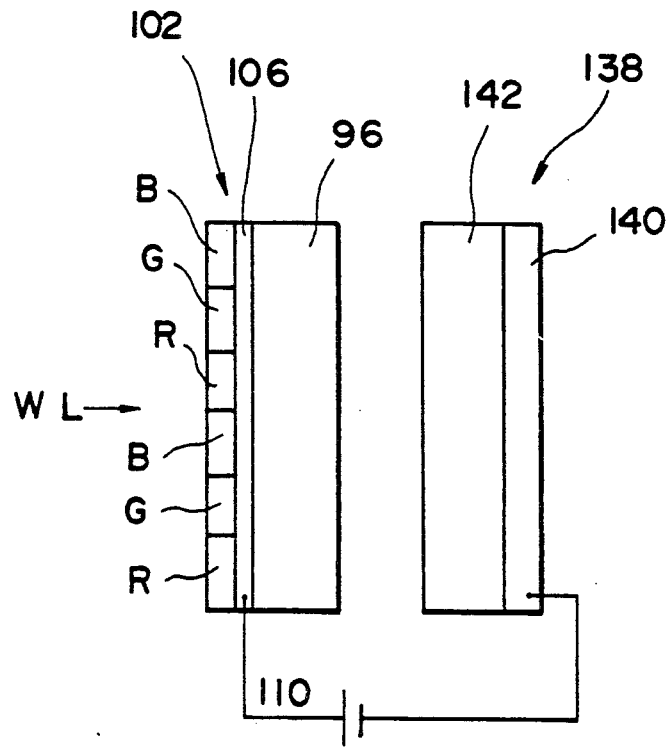
Figure 21:
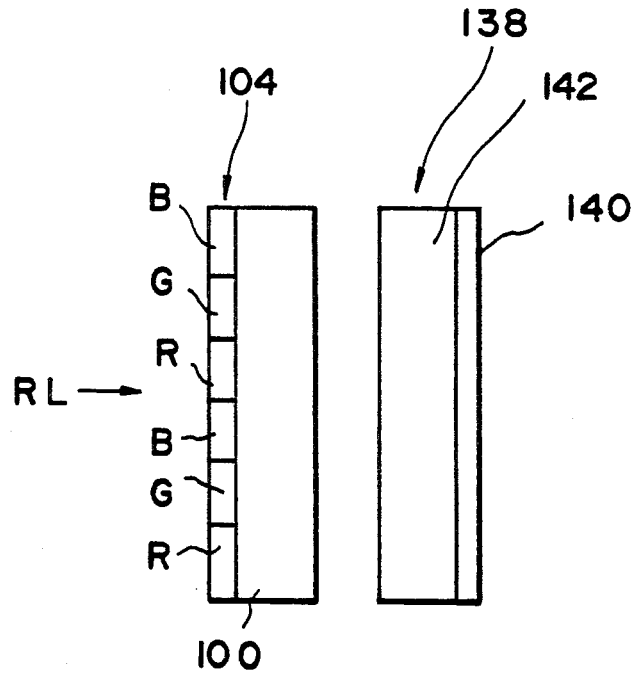

Next, FIGS. 20 and 21 show examples of the apparatus in FIGS. 15 and 17 with the PPT 94 omitted. A recording medium 138 is composed by laminating a transparent electrode 140 and a CHL member 142 transparent to a reading light. There is provided the first and second filters 102 and 104 in FIGS. 20 and 21.

In FIG. 20, the PCL member 96 to which the first filter 102 and the transparent electrode 106 are laminated together is provided to face the CHL member 142 with a minute gap.

When a voltage is applied across the electrodes 106 and 140 by the power supply 110 and a writing light WL carrying an image information intended to be recorded is incident to the PCL member 96 through the first filter 102, the light WL is separated into electro-magnetic radiation beams with different wavelength ranges each by the filter elements R, G and B of the first filter 102 to be supplied to the PCL member 96.

The electric resistance of the PCL member 96 varies according to the intensity of the electro-magnetic radiation beams supplied thereto through the filter elements R, G and B. Discharge then occurs across the PCL member 96 and the recording medium 138 according to variation of the electric resistance of the PCL member 96 to form a charge image on the CHL member 142.

Next, the recording medium 138 shown in FIG. 21 is prerecorded with the charge image as described above. The second filter 104 laminated to the PML member 100, which faces the CHL member 142 of the recording medium 138, is arranged such that a plurality of the filter elements R, G and B having different characteristics correctly correspond to the filter elements R, G and B having different characterictics of the first filter 102 shown in FIG. 20.

When a reading light RL is incident to the PML member 100 through the second filter 104 in FIG. 21, the light RL passes through the CHL member 142 and the electrode 140 and is emitted therefrom. The light RL thus emitted is already modulated by the electric field caused by the charge image prerecorded on the CHL member 142 when it passes through the PML member 100. The light RL emitted from the electrode 140 is then incident to an analyzer (not shown) to have an intensity varying according to the image information carried by the light WL.

The light RL may be applied with (1) to (4) described with reference to FIGS. 15 and 17. When the light RL is incident to the second 104, it is separated into three primary colors. Each color light thus separated then passes through the PML member 100 and is modulated therein by the electric field caused by the charge image formed on the CHL member 142. The reading light emitted from the recording medium 138 then passes through the analyzer (not shown) to obtain a color image information.

Next with reference to FIG. 22, a seventh preferred embodiment according to the present invention will be described wherein a plurality of electro-magnetic wave information in different wavelength ranges from each other is processed by a common signal processing means with the electro-magnetic wave information-processing apparatus.

Figure 22:
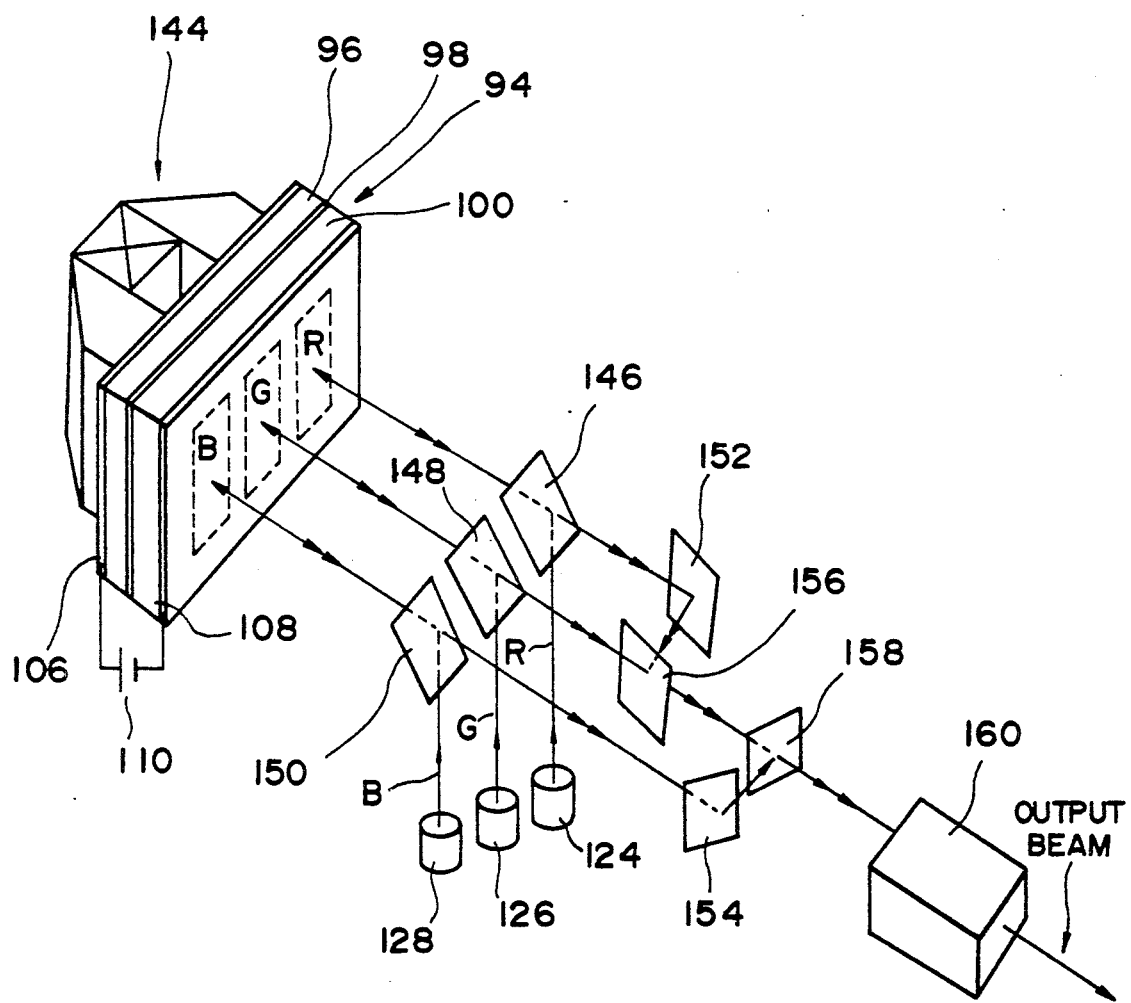
FIG. 22 is a block diagram of a color image information processing apparatus applied in the seventh preferred embodiment of the recording/reproducing system according to the present invention.

A three color separation optical system 144 in FIG. 22 corresponds to the first filter 102 shown in FIGS. 15 and 17 to 21. The configuration of the three-color separation optical system 144 is described in EP Application No. 88308314.9 in detail, the contents of which is incorporated herein by reference.

The electro-magnetic beams (reading light), having different wavelength ranges, from each emitted from the electro-magnetic radiation sources 124, 126 and 128 are incident to the PPT 94 through beam splitters 146, 148 and 150. These reading lights correspond to those incident to the PPT 94 through the second filter 104 in FIGS. 15 and 17. The three reading lights having different wavelength ranges from are respectively used for reading three information divided into electro-magnetic wave information having different wavelength ranges from each by the three-color separation optical system 144.

Three charge images separated by the three-color separation optical system 144 and corresponding to three optical systems are generated on three charge image regions R, G and B formed on the border of the PCL member 96 and the dielectric mirror 98 of the PPT 94. The electro-magnetic radiation beams having different wavelength ranges from each other emitted from the three electro-magnetic radiation sources 124, 126 and 128 are incident to the PPT 94 as reading light through the beam splitters 146, 148 and 150. The three charge images are thus read out respectively and supplied to a common image processing section 160.

That is to say, the electro-magnetic radiation beam as the reading light, emitted from the electro-magnetic radiation source 124, is incident to the electrode 108 of the PPT 94 through the beam splitter 146 reciprocates in the PML member 100, and is then emitted from the electrode 108. Then the electro-magnetic radiation beam carrying charge image information formed on the charge image region R of the PPT 94 is incident to the common image processing section 160 through the beam splitter 146, a total reflection mirror 152, dichroic mirrors 156 and 158 in this order.

The electro-magnetic radiation beam as the reading light, emitted from the electro-magnetic rad source 126, is incident to the electrode 108 of the PPT 94 through the beam splitter 148, reciprocates in the PML member 100, and is then emitted from the electrode 108. Then the electro-magnetic radiation beam carrying charge image information formed on the charge image region G of the PPT 94 is incident to the common image processing section 160 through the beam splitter 148 and the dichroic mirrors 156 and 158 in this order.

Furthermore, the electro-magnetic radiation beam as the reading light, emitted from the electro-magnetic radiation source 128, is incident to the electrode 108 of the PPT 94 through the beam splitter 150, reciprocates in the PML member 100, and then emitted from the electrode 108. Then the electro-magnetic radiation beam carrying charge image information formed on the charge image region B of the PPT 94 is incident to the image processing section 160 through the beam splitter 150, the total reflection mirror 154, and the dichroic 158 in this order.

As described above, the reading light having different wavelength ranges from each other are processed in the common image processing section 160 and emitted therefrom as an output beam.

The image processing performed in the common image processing section 160 is optical image processing for optical information, such as matrix processing, non-linear processing, contour enhancement processing, gain control (amplification and attenuation) and the like. Examples of the arrangement of the apparatus performing such image processing are shown in FIGS. 23 to 31.

Figure 23:
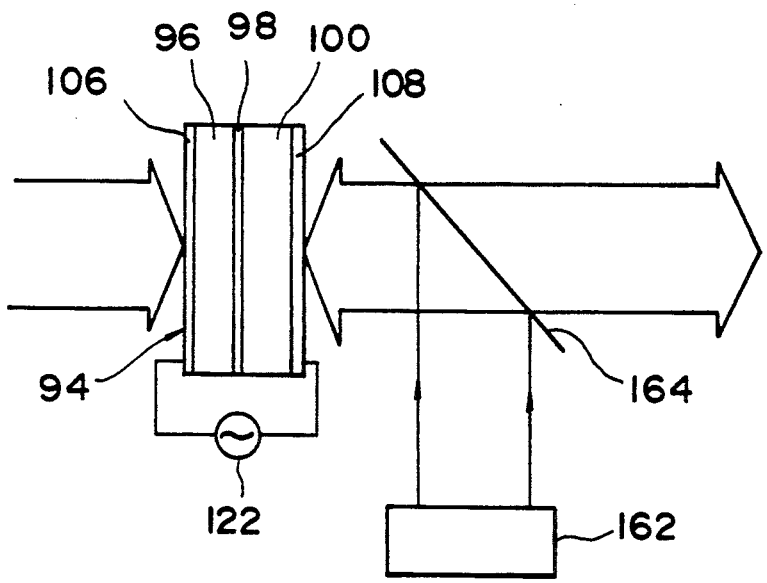
FIGS. 23, 24, 26, 27 and 30 are block diagrams of image processing apparatus to process the output of the color image information processing apparatus shown in FIG. 22.

FIG. 23 shows a block diagram of an intensity adjusting system employing the PPT 94 which has the configuration described with reference to FIG. 16.

An electro-magnetic radiation beam whose intensity is to be adjusted is incident to the electrode 106 of the PPT 94. Moreover, an electro-magnetic radiation beam for reading operation is incident to the electrode 108 of the PPT 94 from a generator 162 through a beam splitter 164.

The generator 162 adjusts the intensity of the beam to be incident to the electrode 108 to adjust the original intensity of the beam incident to the electrode 106.

Figure 24:
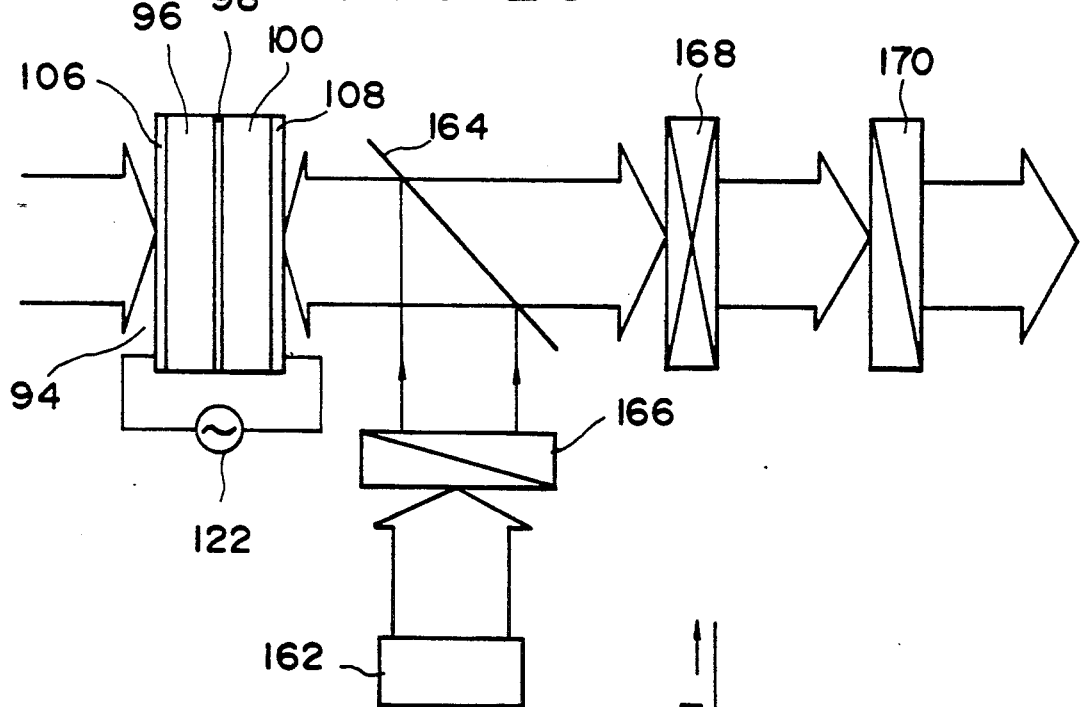

Next, FIG. 24 is a block diagram of a polarity inversion system for inverting the polarity of the image, employing the PPT 94 which also has the configuration described with reference to FIG. 16.

An electro-magnetic radiation beam whose image polarity is to be inverted is incident to the electrode 106 of the PPT 94. An electro-magnetic radiation beam for reading operation is incident to the electrode 108 of the PPT 94 from the generator 162 through a polarizer 166 and the beam splitter 164.

The generator 162 adjusts the intensity of the beam for reading operation.

The beam for reading operation incident to the electrode 108 is modulated due to the electric field generated from the charge image recorded on the PPT 94, formed by means of the beam carrying the image information whose image polarity is to be inverted, and is supplied to a wave-plate 168 through the beam splitter 164.

Figure 25:
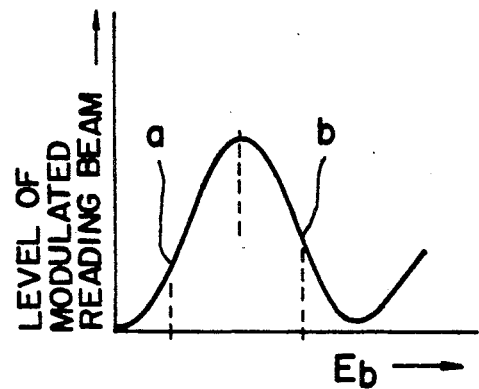
FIGS. 25, 28, 29 and 31(a-e) are the characteristics and waveforms for explaining the image processing operation shown in FIGS. 23, 24, 26, 27 and 30.

FIG. 25 is a photoelectric characteristic curve of the system including the PPT 94 and the analyzer 170, in which the ordinate axis denotes the reading beam modulated according to the intensity variation of the beam incident to the electrode 108 of the PPT 94 and carrying the image information whose image polarity is to be inverted, while the abscissa axis denotes a voltage Eb applied across the electrodes 106 and 108 of the PPT 94.

As is obvious from the curve shown in FIG. 25, when the operating range of the PML member 100 is set to the point a by varying the peak value of the voltage applied by the a.c. power supply 122, the polarity of the generated beam is the same as that of the beam carrying the image information. While, setting the operating point to the point b causes the polarities to be inverted. This results in polarity inversion of the image between the two images emitted to and from the PPT 94 respectively. Setting the operating point to the point b is done by the adjustment of the wave-plate 168 or a reorientation of the analyzer 170.

Figure 26:
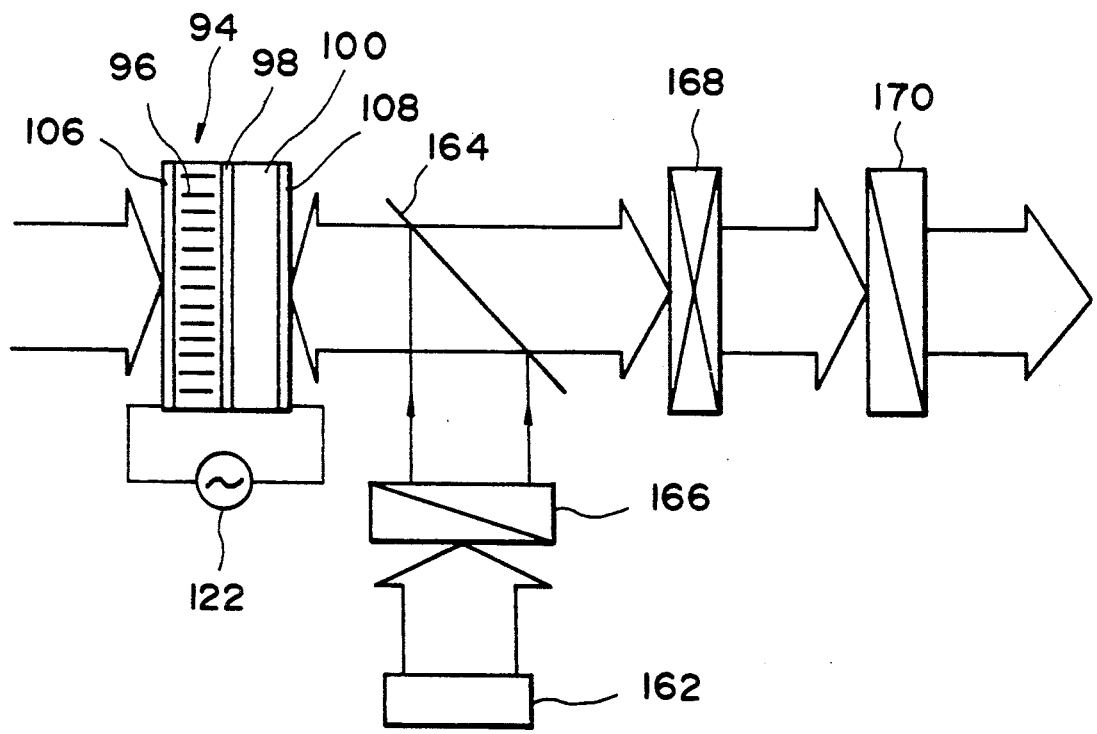
Figure 27:
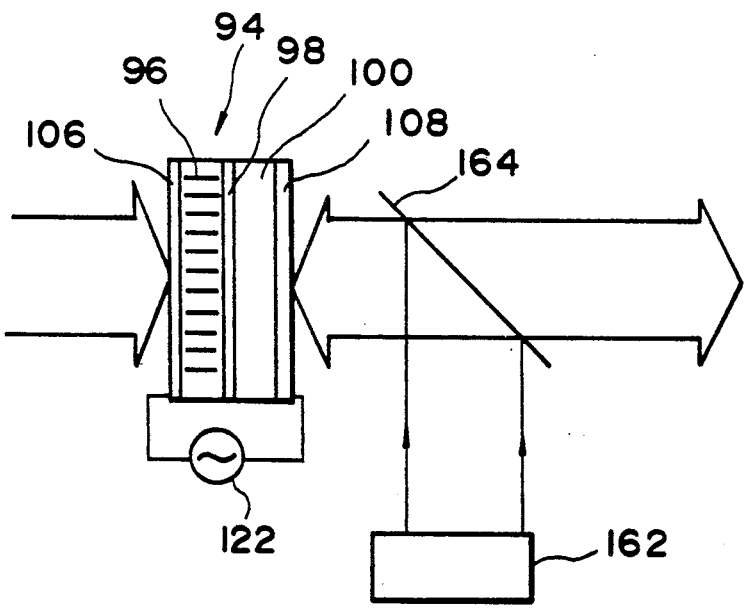
Figure 28:
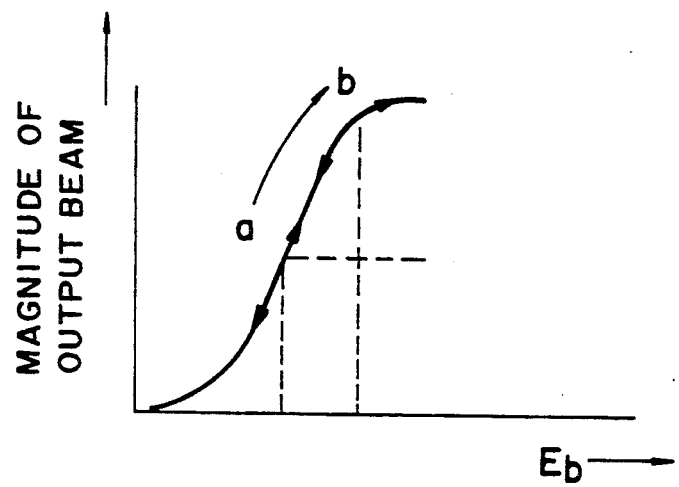
Figure 29:
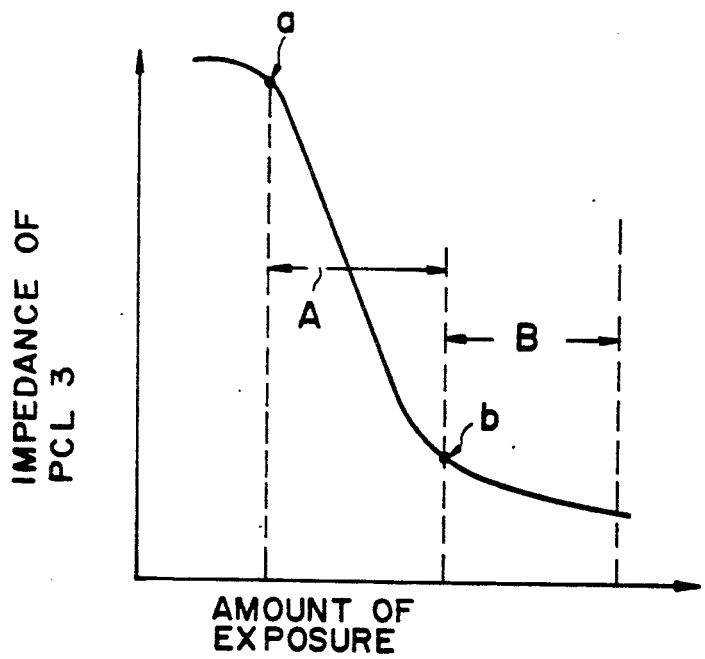

Next, FIGS. 26 and 27 show the block diagrams of different arrangements of a non-linear processing (gamma correction, etc.) apparatus including the PPT 94. FIG. 28 is a characteristic curve for explaining the non-linear processing apparatus shown in FIG. 26. FIG. 29 is a characteristic curve for explaining the non-linear processing apparatus shown in FIG. 27.

The PPT 94 in the non-linear processing apparatuses shown in FIGS. 26 and 27 has the same configuration as that shown in FIG. 16

First in FIG. 26, an electro-magnetic radiation beam carrying the image information which is to be nonlinearly processed is incident to the electrode 106 of the PPT 94. An electro-magnetic radiation beam for reading operation generated from the generator 162 is incident to electrode 108 of the PPT 94 through the the polarizer 166 and the beam splitter 164.

According to the process explained previously with FIG. 16, the beam incident to the electrode 108 is modulated correspondingly with the charge image recorded on the PPT 94 by means of the beam incident to the electrode 106 and is emitted out from the electrode 108. The beam thus modulated passes through the beam splitter 164, and is supplied to the wave-plate 168.

FIG. 28 is a photoelectric characteristic curve of the ordinate PML 100 of the PPT 94 in which the axis denotes a magnitude of the modulated beam which is outputted in response to the intensity variation of the beam incident to the electrode 106 and carrying the image information whose characteristics are to be modified for such as by gamma-correction, while the abscissa axis denotes a voltage Eb applied to the PML member 100 of the PPT 94.

As is obvious from FIG. 28, when the operating range of the PML 100 is reset from the range a to b by varying the peak value of the voltage applied by the a.c. power supply 122, the PPT 94 linearly operated in the linear region a of the curve is changed to be nonlinearly operated in the non-linear region b.

Next in the nonlinear processing apparatus shown in FIG. 27, an electro-magnetic radiation beam carrying the image information which is to be nonlinearly processed is incident to the electrode 106 of the PPT 94, an electro-magnetic radiation beam for reading operation is generated from the generator 162 and is incident to the electrode 108.

The beam incident to the electrode 108 is modulated due to the charge image recorded on the PPT 94 by means of the beam incident to the electrode 106 and is emitted from the electrode 108. The beam thus modulated passes the beam splitter 164 and is emitted through therefrom.

FIG. 29 is a characteristic curve of the PCL member 96 of the PPT 94 showing the relationship of the amount of exposure to the incident light and impedance of the PCL member 96. It is obvious from FIG. 29 that if the intensity (level) of the beam carrying the image information and incident to the electrode 106 is adjusted by some known means (not shown in FIG.. 27), the operating range of the PCL member 96 can be shifted from the range a to b, i.e. from the linear range A to the nonlinear range B. This causes the input/output characteristic of the PPT 94 with respect to the input and output beams to become linear.

In the case of operating the PCL member 96 in its non-linear range, such non-linear characteristic is selected to achieve the desired overall linear or non-linear characteristic of the total system.

Figure 30:
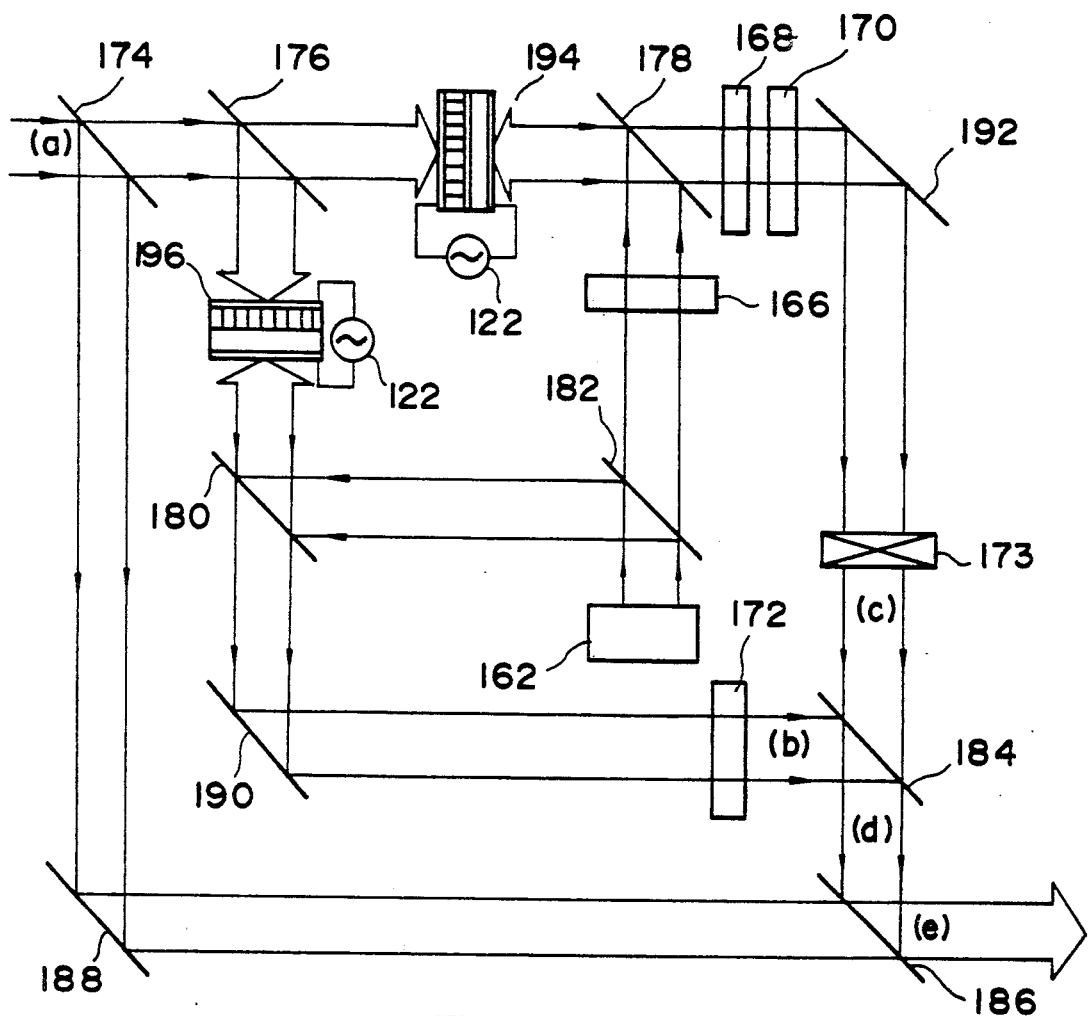
Figure 31A:
Figure 31B:
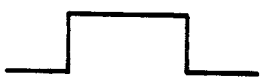
Figure 31C:
Figure 31D:
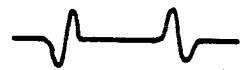
Figure 31E:
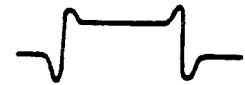

FIG. 30 shows a block diagram of a contour enhancement apparatus including the PPTs. The PPCs 194 and 196 each of which has the configulation shown in FIG. 16.

The contour enhancement apparatus shown in FIG. 30 is provided with beam splitters 174, 176, 178, 180, 182, 184 and 186, total reflection mirrors 188, 190 and 192, the generator 162 for generating the electro-magnetic radiation beam for reading the information from the PPTs 194 and 196, the wave-plate 168 for adjusting optical bias (input intensity level) of the PPTs 194 and 196, the polarizer 166, analyzers 170 and 172 and a lowpass filter 173.

The electro-magnetic radiation beam carrying the information to be processed and denoted by (a) in FIG. 31 is incident to the beam splitter 174 and is split by the beam splitter 176 into one beam incident to the PPT 194 and other beam incident to the PPT 196.

The beam reflected at the beam splitter 174 is reflected at the total reflection mirror 188, then passes through beam splitter 186 to be emitted therefrom.

The part of the beam generated from the generator 162 is incident to the PPT 194 through the beam splitter 182, the polarizer 166 and the beam splitter 178 in order. The part of the beam generated from the generator 162 is incident to the PPT 196 through the beam splitters 182 and 180 in order.

The beam (b) returned from the PPT 196 and carrying the read out information is supplied to the beam splitter 184 through the beam splitter 180, the total reflection mirror 190 and the analyzer 172 in order. The beam (b) thus returned from the PPT 196 the same polarity (of the waveform representing intensity variation of the beam) as that of the beam (a) incident to the PPT 196.

On the other hand, the beam returned from the PPT 194 and carrying the read out information is supplied to the beam splitter 184 through the beam splitter 178, the wave-plate 168, the analyzer 170, the total reflection mirror 192 and the optical lowpass filter 173 in order. The beam (c) thus returned HAS a waveform of the opposite polarity and a slow rise and fall in contrast to that of the beam (a) incident to the PPT 194. The latter is caused by the optical lowpass filter 173, which reduces the high-frequency components of the image. And, the polarity inversion may be done by the system explained previously with FIG. 24.

The beam emitted from the beam splitter 184 therefore has the waveform denoted by (d) in FIG. 31, which is the result of the superposition of the waveforms denoted by (b) and (c) in FIG. 31 and supplied to the beam splitter 186.

Since the beam denoted by (a) in FIG. 31 is supplied to the beam splitter 186 after being reflected at the beam splitter 174 and the total reflection mirror 188, the beam emitted from the beam splitter 186 has the waveform denoted by (e) . In FIG. 31 which is the result of the superposition of the waveforms depicted with (a) and (d) in FIG. 31. This results in the contour of the waveform (a) being enhanced to be the waveform (e).

The degree of the contour emphasis depends on the intensity of the beam generated from the generator 162. Furthermore, a matrix circuit can be realized by means of addition, subtraction (polarity inversion and addition) and gain control.

As is understood from the foregoing, a common image processing section performs image information processing by means of a plurality of electro-magnetic radiation beams having different wavelength ranges from each other in the case of performing the image precessing in the form of the electro-magnetic radiation beam without interference of the electro-magnetic radiation beams with each other. In the case of performing the image processing in the form of electric signals, the configuration of the image processing section can be simplified, since there is no image processing apparatus for each image information.

Figure 32:
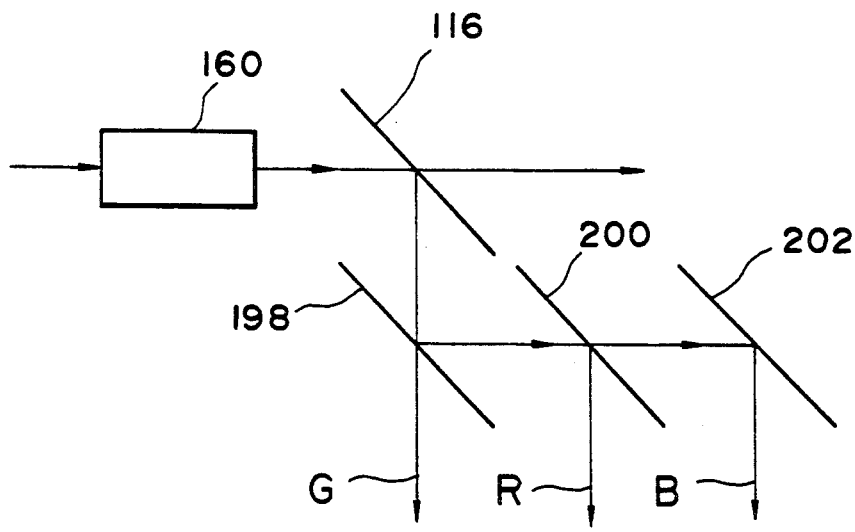
FIGS. 32 and 33 are block diagrams of the arrangement of the color image information processing apparatus output side thereof according to the present invention.

The electro-magnetic radiation beam outputted from the image processing section 160 in FIG. 22, after the image processing section 160 commonly performed image information processing by means of the plurality of electro-magnetic radiation beams with different wavelength ranges from each other, is separated into the plurality of electro-magnetic radiation beams with different wavelength ranges from each other and outputted respectively by means of an electro-magnetic radiation beam separation system, shown in FIG. 32, composed of the beam splitter 116, dichroic mirrors 198 and 200 and a total reflection mirror 202.

That is, the electro-magnetic radiation beam thus outputted from the image processing section 160 in FIG. 22 is incident to the beam splitter 116 in FIG. 32. One beam of the beam thus incident to the beam splitter 116 passes therethrough, whereas the other is reflected thereat and supplied to the dichroic mirrors 198.

The electro-magnetic radiation beam thus passing through the beam splitter 116 is made to be the beam which is a superimposition of the plurality of beams with diferrent wavelength ranges from each other. In the dichroic mirror 198, the beam with the wavelength range of green light passes therethrough to be emitted, while the beams with the wavelength ranges of red and blue light are reflected threat.

The beams thus reflected at the dichroic mirror 198 are supplied to the dichroic mirror 200 where the beam with the wavelength range of blue light passes therethrough and the beam with the wavelength range of red light is reflected thereat. Then the beam with the wavelength range of blue light thus passing through the dichroic mirror 200 is reflected at the total reflection mirror 202 and emitted therefrom.

Figure 33:
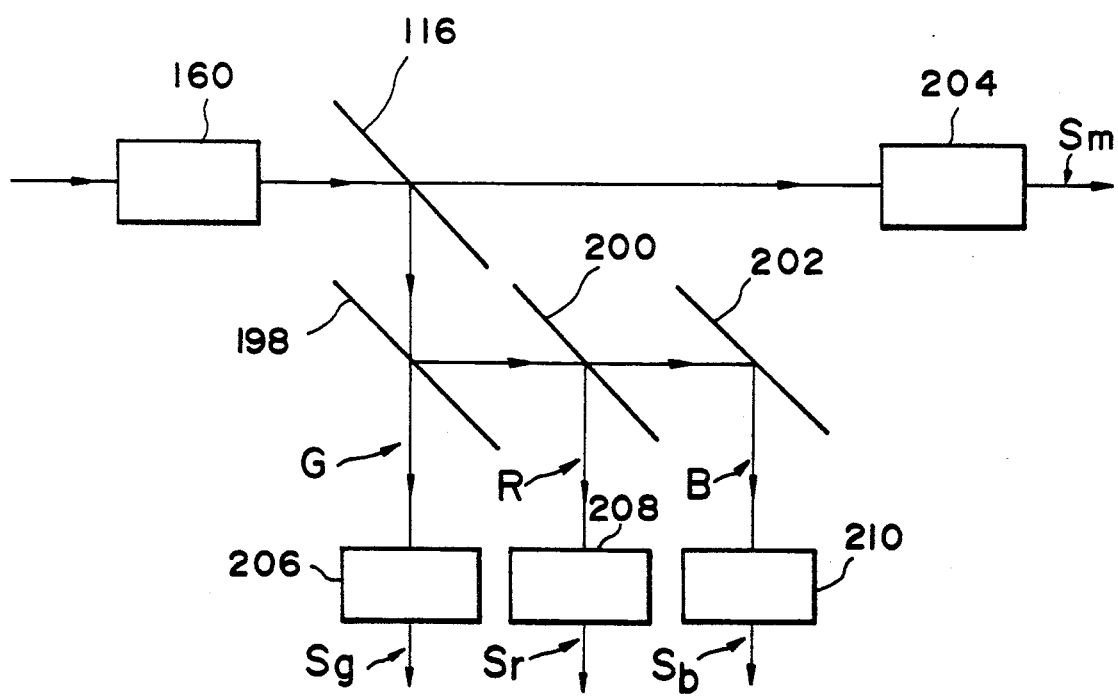

Then, each of the electro-magnetic radiation beams thus emitted from the electro-magnetic radiation separation system are converted into electric signals by means of photoelectric converters 204, 206, 208 and 210, as shown in FIG. 33.

The present invention may be practiced or embodied in still other ways without departing from the sprit or essential character thereof. For instance, the reading light for reproduction may be incident to the recording medium or the reproducing head entire surface thereof at one time. Or spot- or beam-like reading light may be incident thereto to scan their surface.

As for the color-separation filter, it may be formed as an island, a dot and the like other than the stripe used in above the above embodiments. Width and size may be the same for each color or different from each other. The color-separation filter further may correspond to the wavelength of the electro-magnetic wave for recording/reproduction other than the primary color filter R, G and B or the additive complementary color filter C, M and Y.

The recording medium may be formed as a card, a disk, a film and the like.

The embodiments described above are the examples of color separation using visible radiation. However, the charge latent image may be obtained by frequency-separation of infrared or ultraviolet radiation by means of a proper filter means. The charge latent image thus obtained further may be read out using visible radiation.

Recording of the information onto the recording medium is performed not only with the charge latent image, but also any other means if recording/reproduction can be performed with electro-magnetic wave radiation.

What is claimed is:

1. An apparatus for processing information carried by an electro-magnetic radiation beam, comprising:
   charge latent image holding member on which charge latent images are prerecorded;
   beam generating means for generating an electro-magnetic radiation beam which is a superimposition of a plurality of electro-magnetic radiation beams having different wavelength ranges;
   filter means for separating said superimposed beam generated by said beam generating means into said plurality of electro-magnetic radiation beams; and
   photo-modulation member provided adjacent to said charge latent image holding member an electro-optic effect occurring therein for each of said plurality of electro-magnetic radiation beams separated by said filter means corresponding to said charge latent images prerecorded on said charge latent image holding member wherein
   said prerecorded charge latent images are reproduced by way of said electro-optic effect.

2. An apparatus for processing information carried by an electro-magnetic radiation beam as claimed in claim 1, wherein said filter means in composed by arranging, with a specific repeating order, a plurality of stripe filters with different characteristics and allowing said plurality of electro-magnetic radiation beams to pass therethrough.

3. An apparatus for processing information carried by an electro-magnetic radiation beam as claimed in claim 1, wherein said filter means in composed by arranging, with a specific repeating order, a plurality of dot filters with different characteristics and allowing said plurality of electro-magnetic radiation beams to pass therethrough.

4. An apparatus for processing information carried by an electro-magnetic radiation beam, comprising:
   charge latent image holding means for storing a charge latent image;
   first beam generating means for generating an electro-magnetic radiation beam which is a superimposition of a first plurality of electro-magnetic radiation beams with different wavelength ranges;
   first filter means for separating said superimposed beam generated by said first beam generating means into said first plurality of electro-magnetic radiation beams;
   photoconductive member provided adjacent to said charge latent image holding means and having an impedance which varies according to an intensity of each of said first plurality of electro-magnetic radiation beams separated by said first filter means;
   second beam generating means for generating an electro-magnetic radiation beam which is a superimposition of a second plurality of electro-magnetic radiation beams with different wavelength ranges;
   second filter means for separating said superimposed beam generated by said second beam generating means into said second plurality of electro-magnetic radiation beams; and
   photo-modulation member provided adjacent to said charge latent image holding means, an electro-optic effect occurring therein for each of said second plurality of electro-magnetic radiation beams separated by said second filter means corresponding to said charge latent images prerecorded on said charge latent image holding means, wherein
   charge latent images corresponding to each of said first plurality of electo-magnetic radiation beams are recorded on said charge latent image holding means and said prerecorded charge latent images are reproduced by way of said electro-optic effect.

5. An apparatus for processing information carried by an electro-magnetic radiation beam as claimed in claim 4, wherein each of said filter means in composed by arranging, with a specific repeating order, a plurality of stripe filters with different characteristics and allowing said respective plurality of electro-magnetic radiation beams to pass therethrough.

6. An apparatus for processing information carried by an electro-magnetic radiation beam as claimed in claim 4, wherein each of said filter means in composed by arranging, with a specific repeating order, a plurality of dot filters with different characteristics and allowing said respective plurality of electro-magnetic radiation beams to pass therethrough.

7. A method of processing information carried by an electro-magnetic radiation beam, comprising the steps of:
   generating a first electro-magnetic radiation beam which is a superimposition of a first plurality of electro-magnetic radiation beams with different wavelength ranges;
   separating said generated superimposed beam into said first plurality of electro-magnetic radiation beams;
   generating discharge by means of said separated beams;
   recording charge latent images on a recording medium corresponding to each of said first plurality of electro-magnetic radiation beams according to said discharge;
   generating a second electro-magnetic radiation beam which is a superimposition of a second plurality of electro-magnetic radiation beams with different wavelength ranges;
   separating said generated second superimposed beam into said second plurality of electro-magnetic radiation beams;
   generating an electro-optic effect for said separated second plurality of electro-magnetic radiation beams by means of said charge latent image thus recorded on said recording medium; and
   reproducing said charge latent images recorded on said recording medium, corresponding to each of said second plurality of electro-magnetic radiation beams separated from said generated second superimposed beam.

8. A method of processing information carried by an electro-magnetic radiation beam, comprising the steps of:
   generating an electro-magnetic radiation beam which is a superimposition of a plurality of electro-magnetic radiation beams with different wavelength ranges;
   separating said generated superimposed beam into said plurality of electro-magnetic radiation beams;
   generating an electro-optic effect for said separated beams by means of charge latent images prerecorded on a recording medium; and
   reproducing said charge latent images, corresponding to each of said plurality of electro-magnetic radiation beams.

* * * * *